(12) United States Patent
Haringer

(10) Patent No.: US 6,640,915 B2
(45) Date of Patent: Nov. 4, 2003

(54) VEHICLE

(75) Inventor: Alois Johann Haringer, Neumarkt (IT)

(73) Assignee: macmoter S.p.A., Modigliana (IT)

( * ) Notice: Subject to any disclaimer, the term of this patent is extended or adjusted under 35 U.S.C. 154(b) by 0 days.

(21) Appl. No.: 09/892,416

(22) Filed: Jun. 27, 2001

(65) Prior Publication Data

US 2002/0005303 A1 Jan. 17, 2002

(30) Foreign Application Priority Data

Jul. 11, 2000 (DE) .......................... 100 33 261

(51) Int. Cl.$^7$ .......................... B62D 7/02; B62D 55/104; B60G 5/02
(52) U.S. Cl. .................... 180/9.26; 180/6.24; 180/9.46; 280/677; 280/124.113
(58) Field of Search ................ 180/9.1, 9.21, 180/9.26, 6.24, 6.26, 6.28, 6.3, 6.7, 9.44, 9.46, 23, 24.01, 9.48; 280/124.11, 677, 682, 124.111, 124.113, 124.116, 6.154

(56) References Cited

U.S. PATENT DOCUMENTS

| | | | | |
|---|---|---|---|---|
| 1,329,307 A | * | 1/1920 | Norelius | |
| 2,878,883 A | * | 3/1959 | Le Roy France et al. | |
| 3,184,867 A | * | 5/1965 | Symmank | |
| 3,455,405 A | * | 7/1969 | Parent | |
| 3,792,745 A | * | 2/1974 | Files | 180/9.46 |
| 3,900,077 A | * | 8/1975 | Gee et al. | 180/9.46 |
| 3,946,822 A | * | 3/1976 | Dohse et al. | 180/9.46 |
| 4,166,511 A | * | 9/1979 | Stedman | 180/9.5 |
| 4,448,273 A | * | 5/1984 | Barbieri | 180/9.21 |
| 4,579,182 A | * | 4/1986 | Dewing et al. | 180/9.46 |
| 5,113,958 A | * | 5/1992 | Holden | 180/9.4 |
| 5,607,210 A | * | 3/1997 | Brazier | 305/131 |
| 6,176,334 B1 | * | 1/2001 | Lorenzen | 180/9.48 |
| 6,244,613 B1 | * | 6/2001 | Renger | 280/124.111 |

FOREIGN PATENT DOCUMENTS

| | | | | |
|---|---|---|---|---|
| DE | 4005357 | * | 8/1991 | 180/9.32 |
| FR | 2591987 | * | 6/1987 | 180/9.1 |

* cited by examiner

Primary Examiner—Anne Marie Boehler
(74) Attorney, Agent, or Firm—W. F. Fasse; W. G. Fasse

(57) ABSTRACT

A vehicle, which can be used in particular as an agricultural vehicle and/or for construction purposes, has a vehicle frame, a drive and an undercarriage. The undercarriage (4, 4a) includes on both sides wheels (12, 13) having tires, and/or chain wheels (70a, 71a) having crawler tracks/chains (72a), which are arranged one behind another in the running direction and as wheel groups (11, 11a), and also can be steered in each case as a wheel group (11, 11a) about a vertical Z-axis (21), and can be pivoted about a transverse Y-axis (19) arranged transversely with respect to the longitudinal X-axis (20) of the vehicle (1, 1a).

12 Claims, 26 Drawing Sheets

VEHICLE

FIELD OF THE INVENTION

The invention relates to a utility vehicle which can be used in particular as an agricultural vehicle and/or as a construction vehicle and comprises a vehicle frame and at least one drive and an undercarriage.

BACKGROUND INFORMATION

Vehicles of the abovementioned type are known. The invention is based on the object of providing measures in order to improve, as compared with conventional vehicles of this type, the use options and, in particular, the off-road mobility and the serviceability and usability both as an agricultural vehicle, for example as a towing vehicle or as tractor and/or for special purposes, and for use as a construction vehicle.

SUMMARY OF THE INVENTION

In order to achieve this object, the invention makes provision for the undercarriage to include on both sides at least one wheel group having wheels or crawler tracks, which wheel group can be pivoted jointly about at least one axis in each case.

In the prior art, in order to steer a vehicle a right wheel and a left wheel are in each case jointly turned. According to the invention, both on the right and on the left at least two wheels in each case are arranged as a wheel group or in tandem one behind another in the running direction and are jointly steered, in which case the wheels of each wheel group can each be rotated about their own wheel axes, but are arranged rigidly with respect to one another.

The vehicle preferably has four wheel groups having two wheels in each case arranged one behind the other, with the result that the vehicle contains in total eight wheels steered in four groups of two.

Individual wheels with tires may in each case be provided as the wheels, but in principle the wheels may also be designed as chain wheels and may serve as supports for crawler tracks.

BRIEF DESCRIPTION OF THE DRAWINGS

Further features of the invention emerge from the subclaims and from the description in conjunction with the drawing.

The invention is described in greater detail below with reference to exemplary embodiments which are illustrated in the drawing, in which.

DETAILED DESCRIPTION OF PREFERRED EXAMPLE EMBODIMENTS OF THE INVENTION

Figure 1:
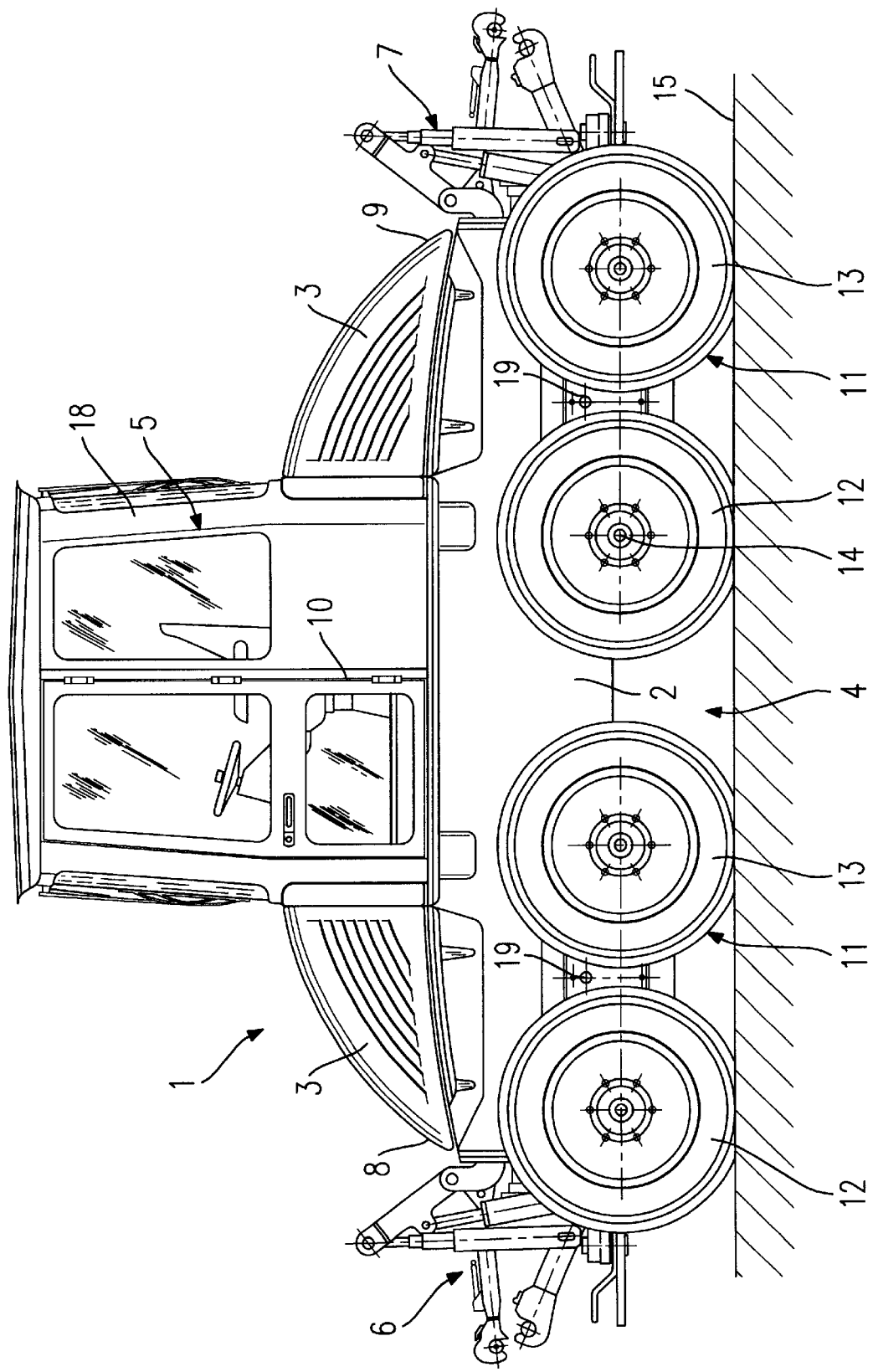
FIG. 1 shows a side view of the vehicle on a level underlying surface.

A vehicle 1 according to FIG. 1, which can be used as an agricultural vehicle and/or as a construction vehicle or as a special-purpose vehicle, comprises a vehicle frame 2, at least one drive 3 in each case and an undercarriage 4 and other superstructures 5 and holding and/or lifting or towing elements and/or working implements 6 and 7 at one or both ends 8 and 9 of the vehicle 1.

The vehicle 1 is preferably equally suitable for travelling forwards and for travelling backwards and has all of the components which are required for this purpose or are expediently present in a twin arrangement and provided in a mirror-inverted manner with respect to a central plane 10 (FIG. 1). According to the exemplary embodiment illustrated in the figures, the undercarriage 4 of the vehicle 1 has four wheel groups 11 having in each case two wheels 12 and 13 which are mounted one behind the other in the running direction and such that they can each be rotated about their own axes 14. On each side of the vehicle 1 two wheel groups 11 are situated one behind the other in the running direction.

FIG. 1 ultimately shows the vehicle 1 which is standing on a level underlying surface 15, so that the wheels 12 and 13 of all of the wheel groups 11 are situated on one and the same level.

Figure 2:
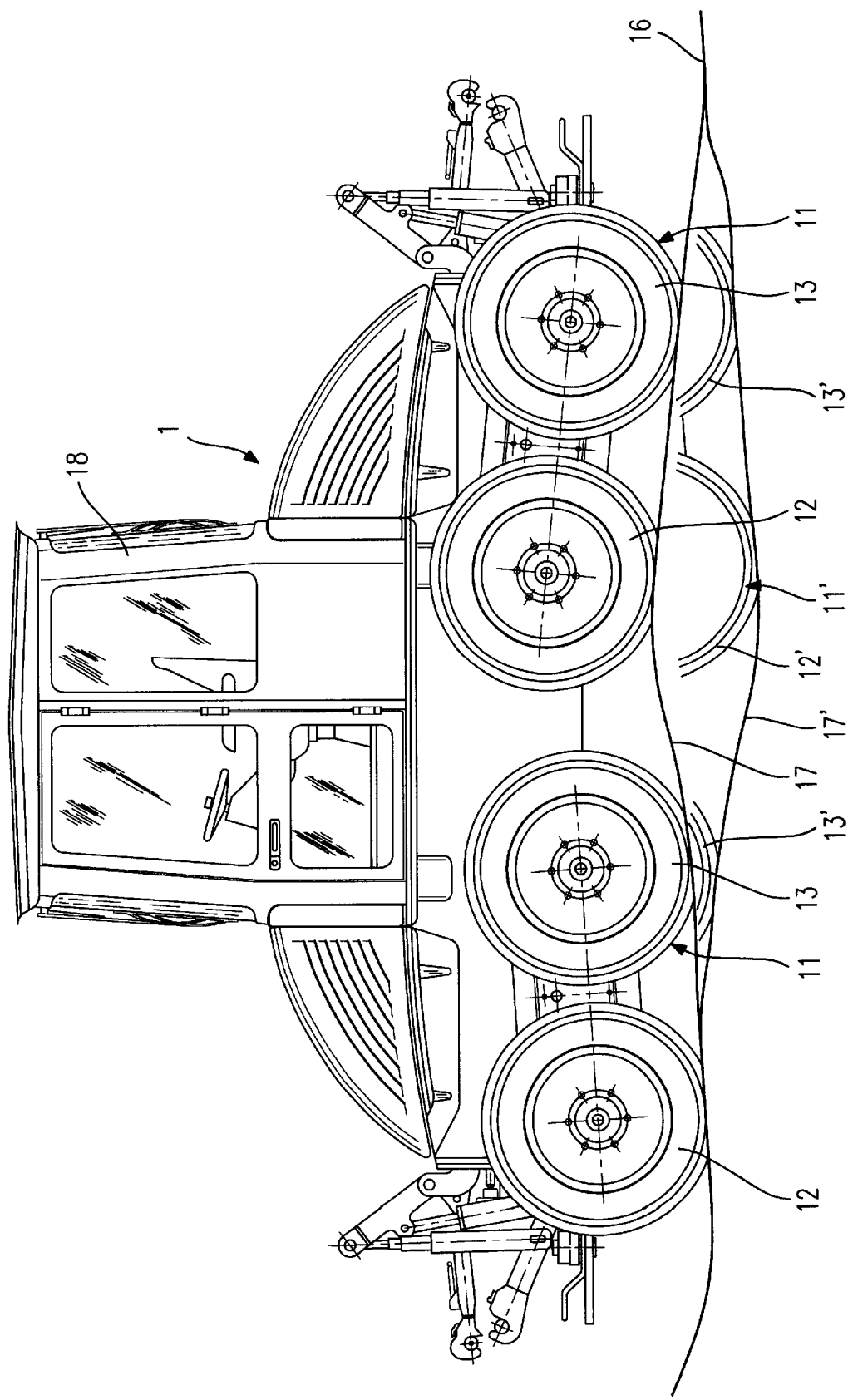
FIG. 2 shows a side view of the vehicle as in FIG. 1 on an uneven underlying surface.

According to the illustration in FIG. 2 the underlying surface 16 is not even. The wheels 12 and 13 on the one side of the vehicle 1 and the wheels 12' and 13' on the other side of the vehicle 1 take up a position corresponding to the particular contour 17, 17' of the uneven underlying surface 16. In the process, the vehicle 1 and its driver's cab 18 nevertheless remain in an approximately horizontal position, as is illustrated in FIG. 2. In order to achieve this, the wheel groups 11 on the one side of the vehicle 1 and the wheel groups 11' on the other side of the vehicle 1 can in each case be pivoted as a unit about a Y-axis 19, which in each case is a transverse axis which is arranged perpendicularly with respect to the X-axis 20 lying in the longitudinal direction of the vehicle (FIG. 7).

Figure 7:
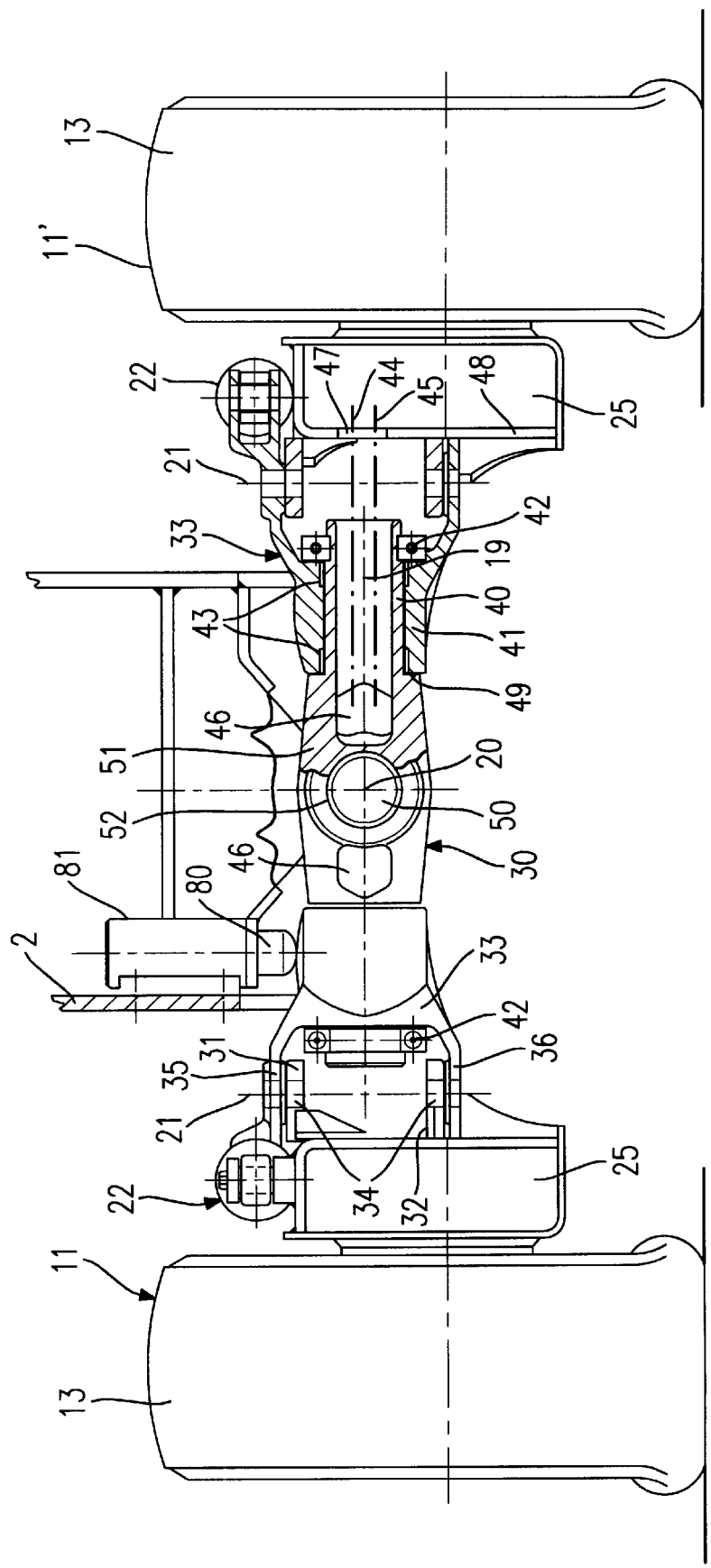
FIG. 7 shows, partially in section, a view of the joint mounting of two opposite wheel groups about a longitudinal axis of the vehicle.
Figure 8:
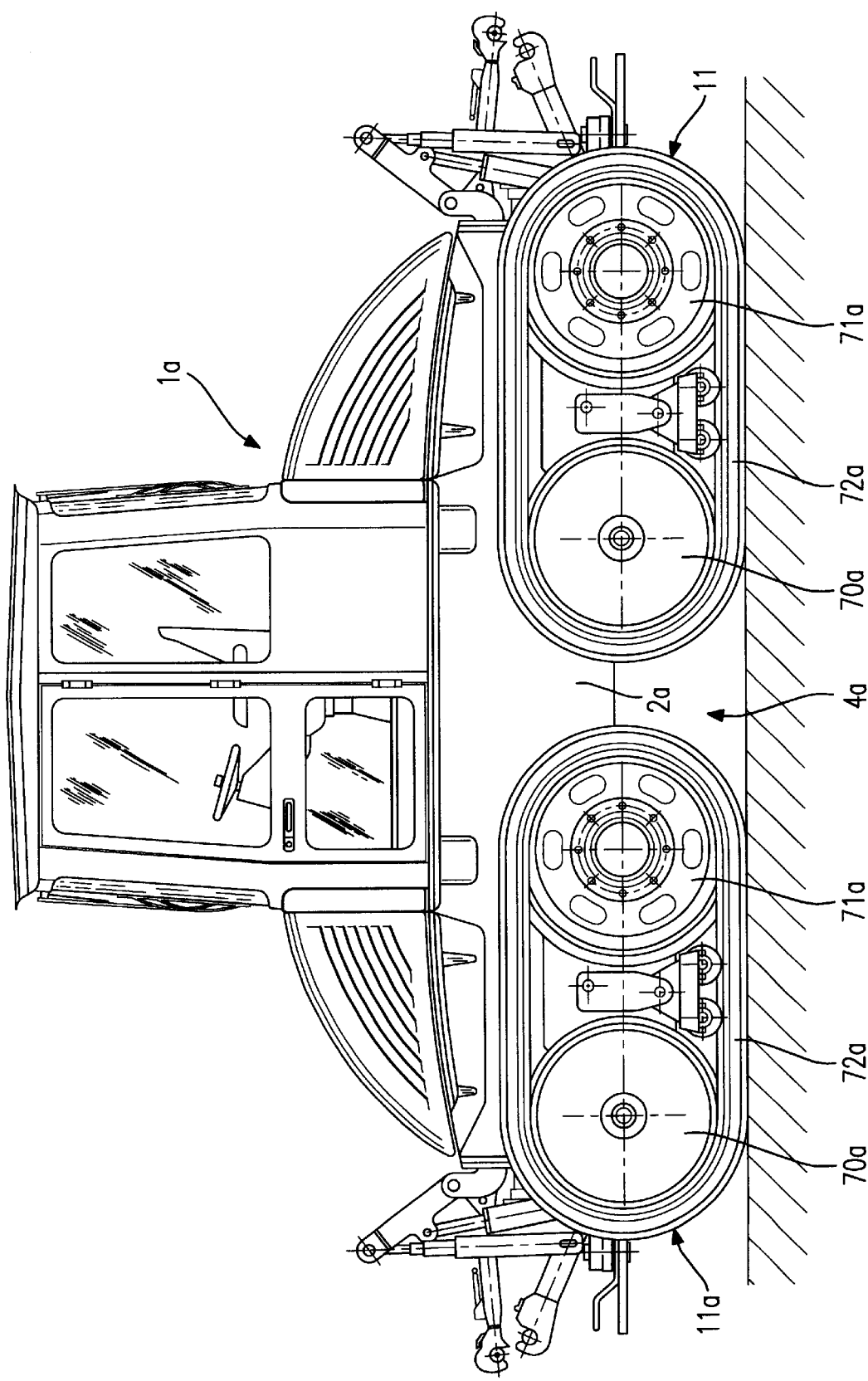
FIG. 8 to FIG. 13 show views as in FIGS. 1 to 6 of a vehicle having crawler tracks.
Figure 9:
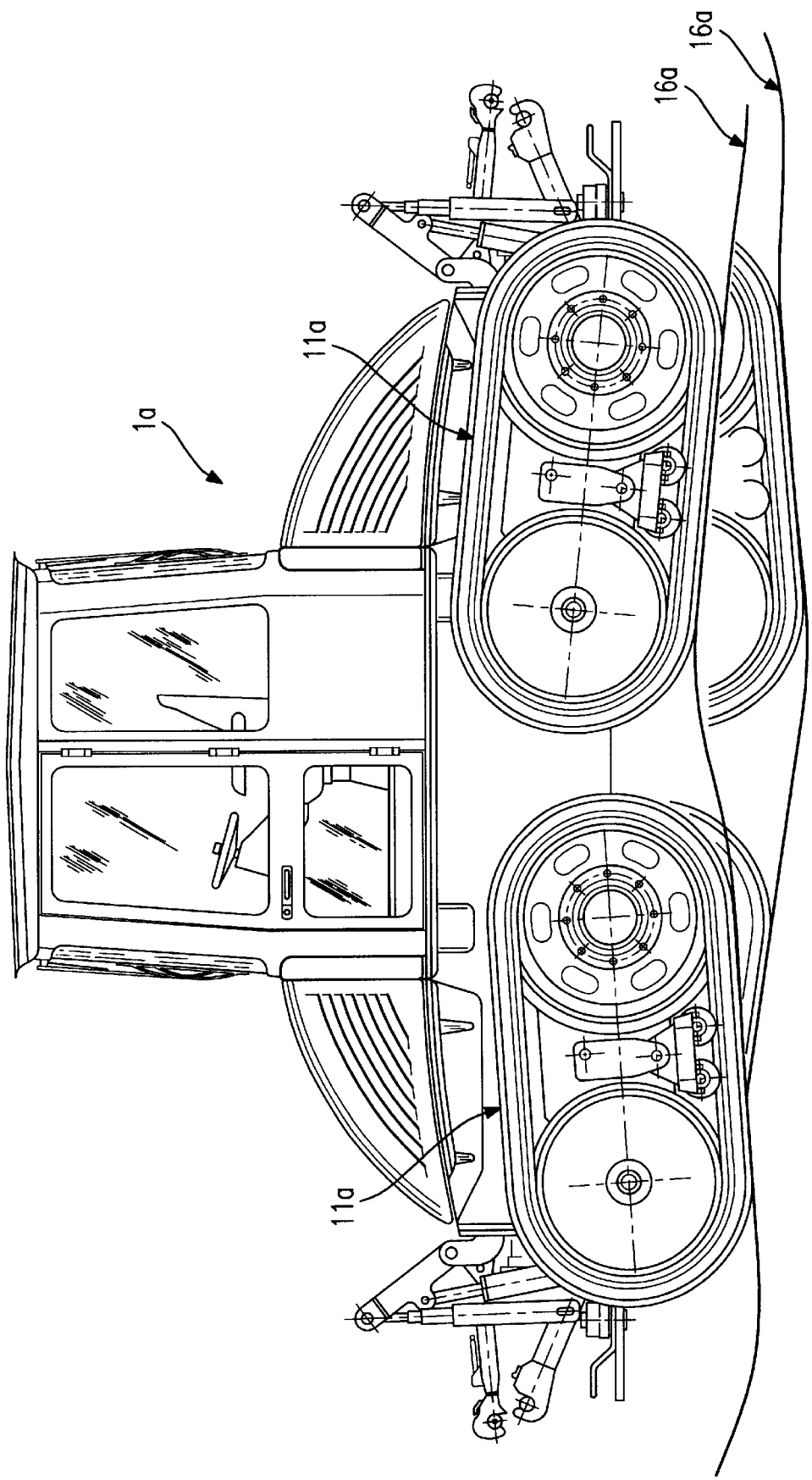
Figure 10:
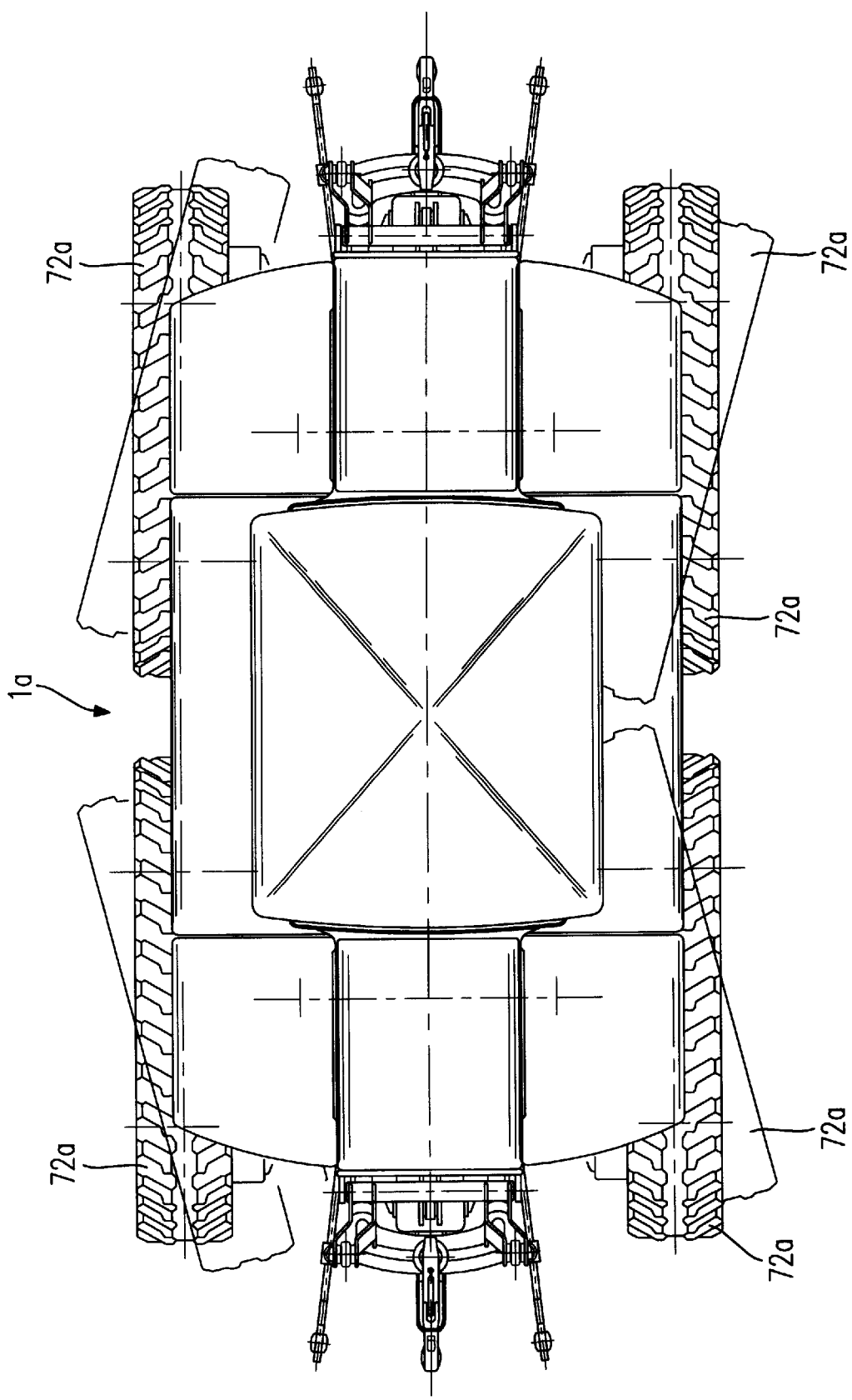
Figure 11:
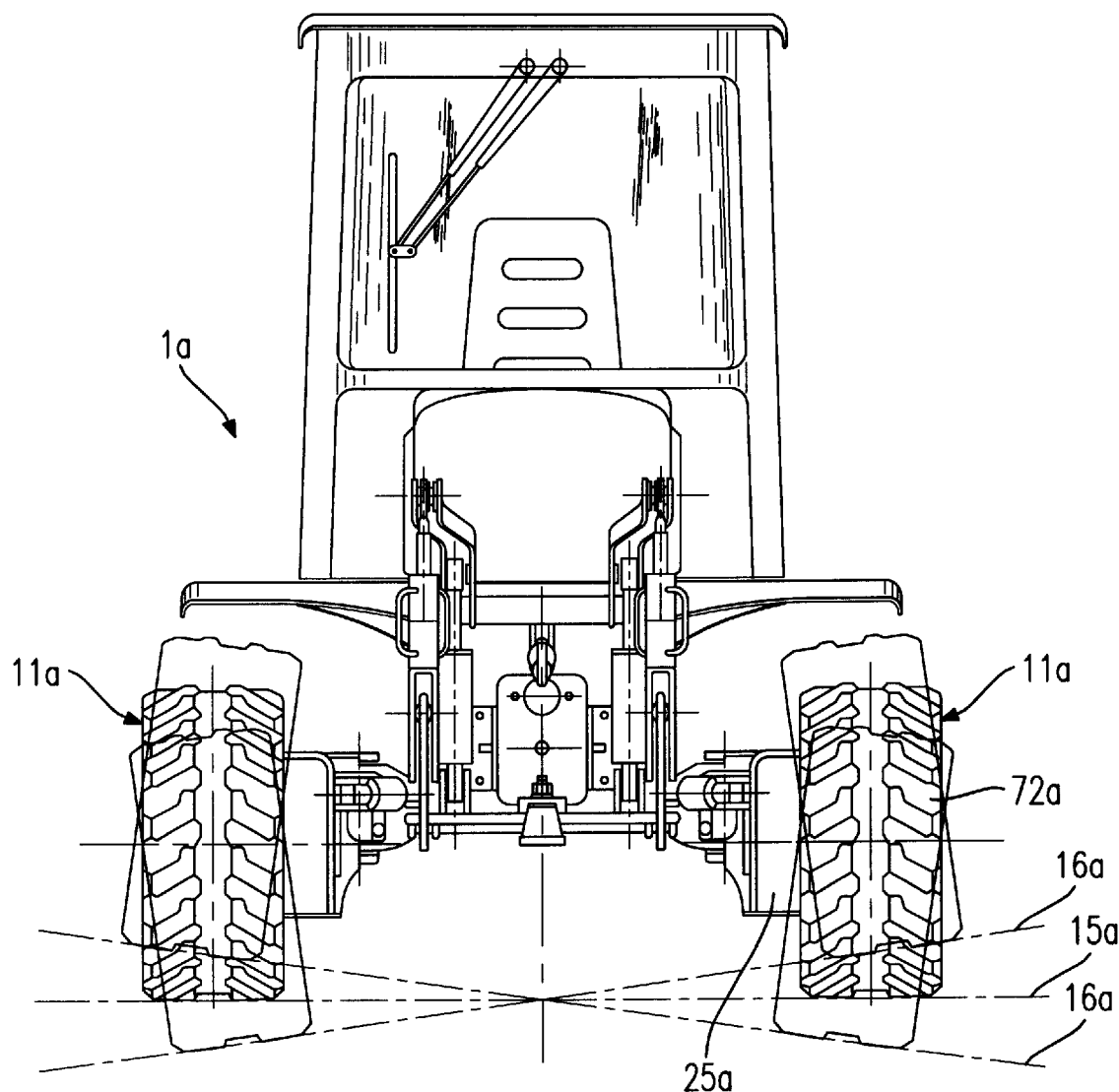
Figure 12:
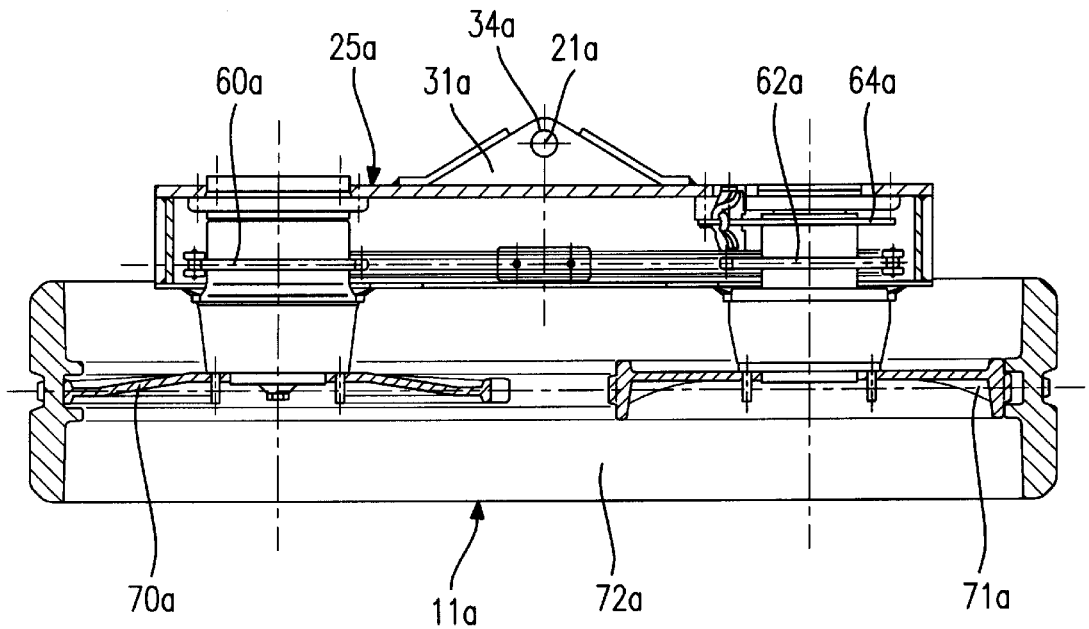
Figure 13:
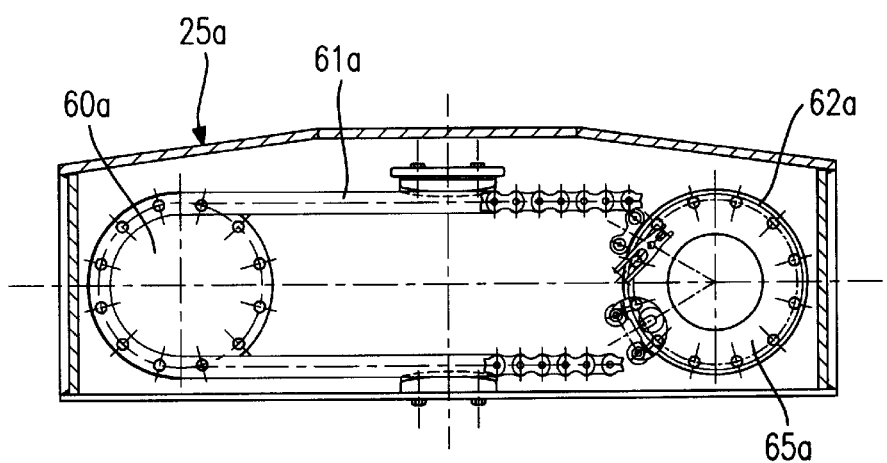
Figure 17:
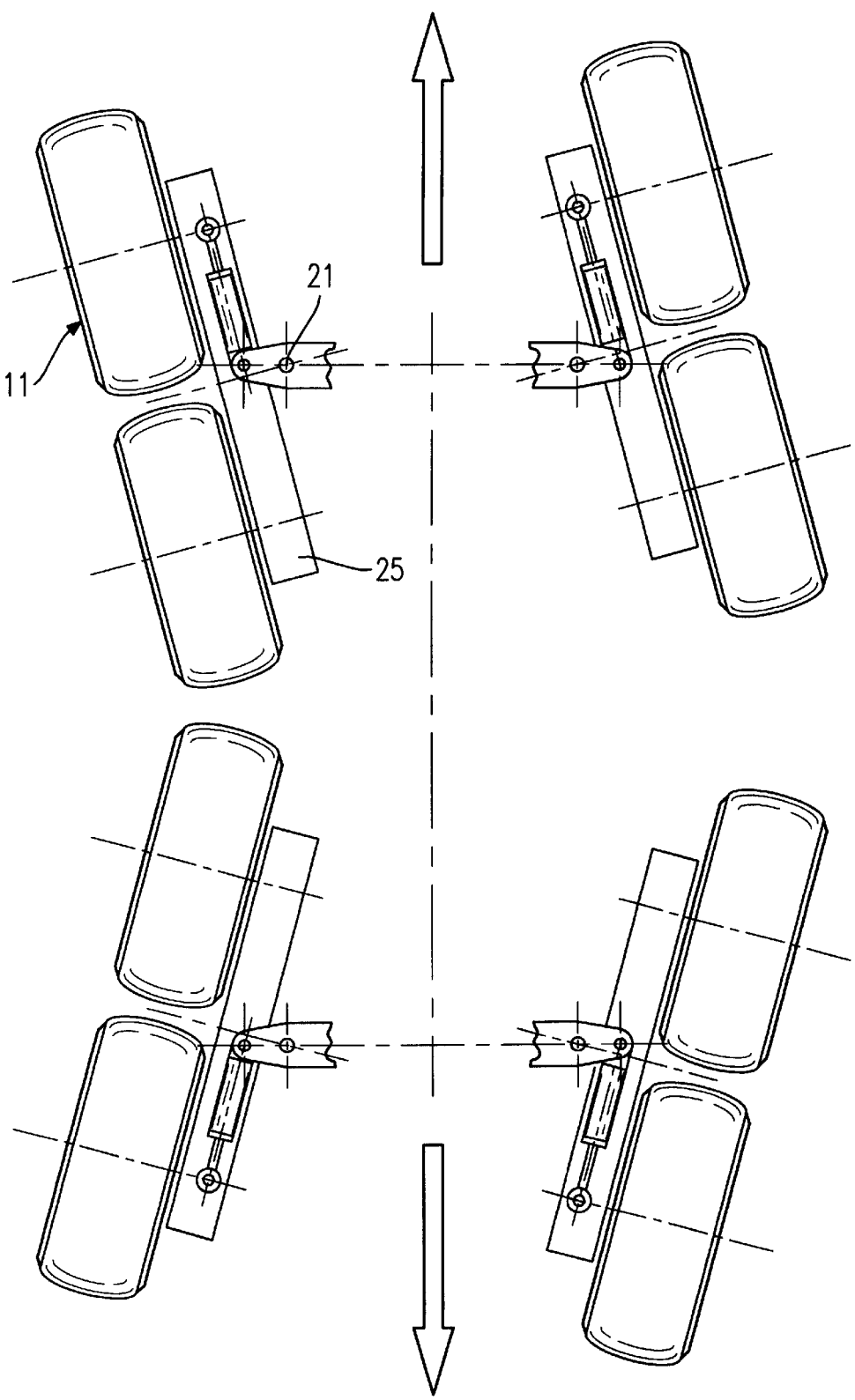
Figure 18:
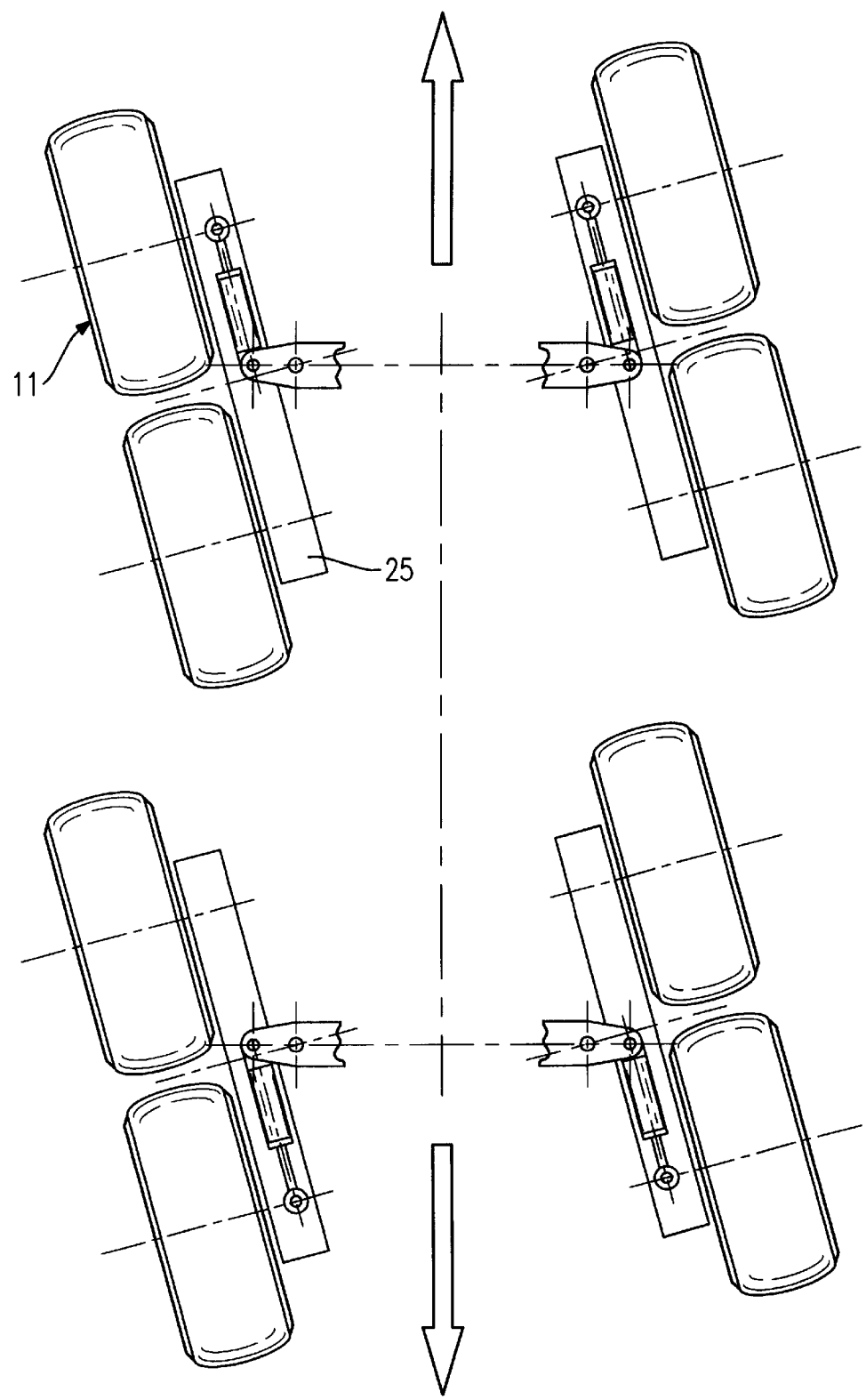

Furthermore, the wheel groups 11 can each be pivoted about a Z-axis 21, about which the wheel groups 11 pivot during steering, for which purpose the Z-axes 21 are arranged perpendicularyly both with respect to the Y-axes 19 and with respect to the X-axis 20 (vehicle—longitudinal axis) (FIGS. 7 and 17).

According to the exemplary embodiment, only the wheel groups 11 and 11' at the one end 9 of the vehicle 1 can be pivoted both about the Y-axis 19 and about the Z-axis 21 and about the X-axis 20. This suffices in order to obtain a high degree of off-road mobility.

Figure 3:
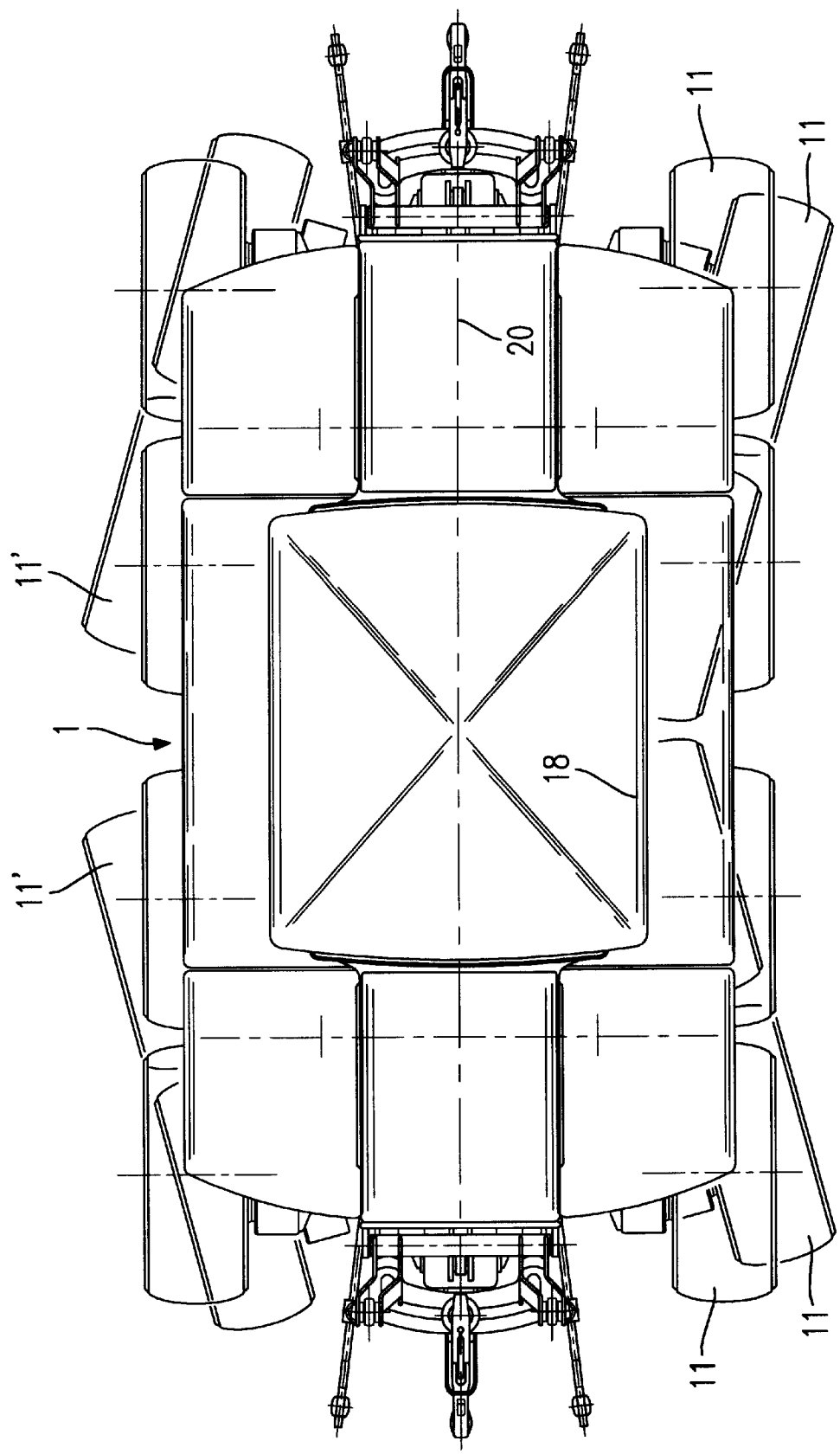
FIG. 3 shows a plan view of the vehicle.
Figure 4:
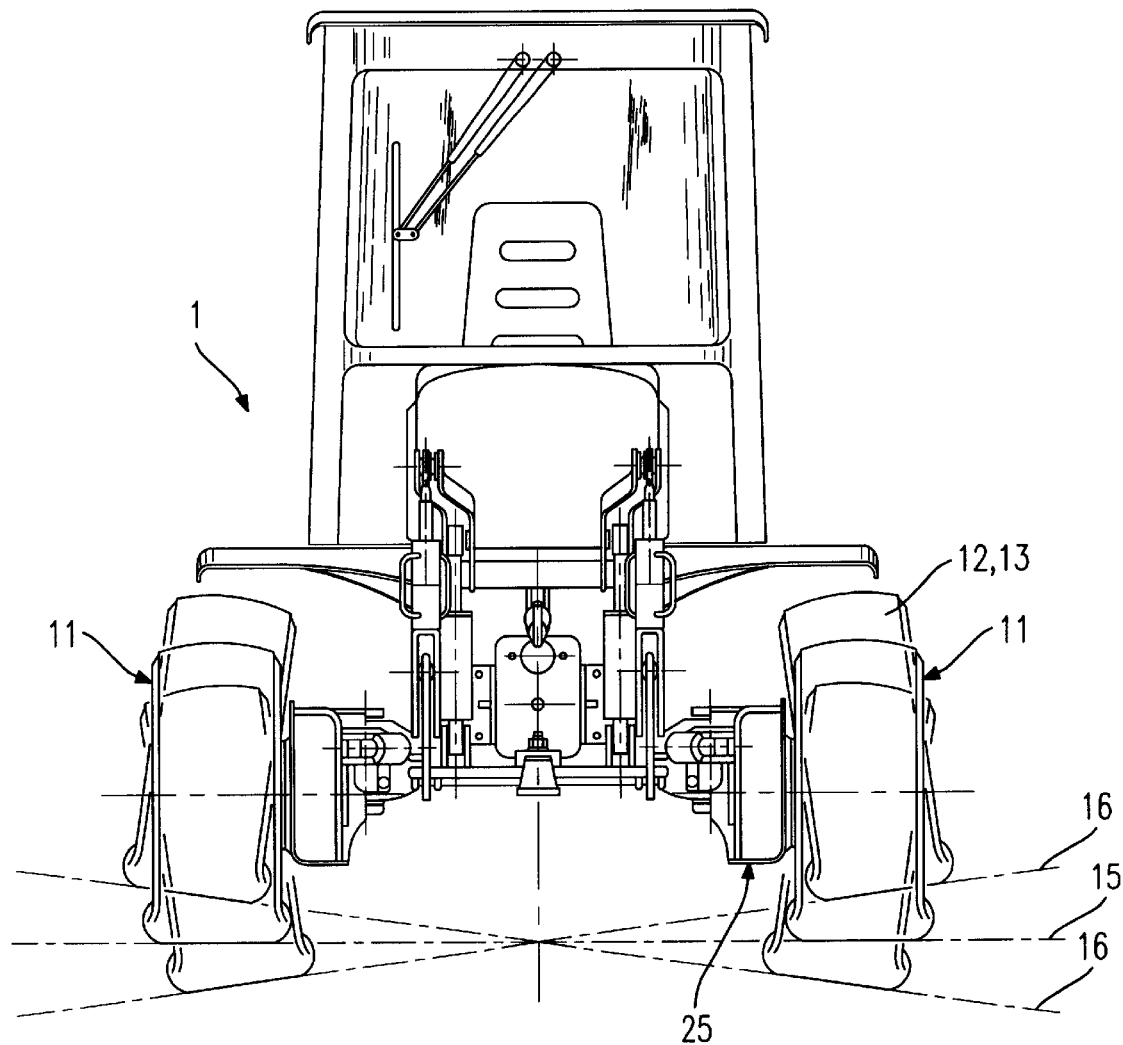
FIG. 4 shows a view from the rear.

The steerability of the wheel groups 11 can be seen in principle from the plan view according to FIG. 3. The wheel groups 11 can be positioned for straight-ahead driving or turned for cornering, in which case the wheel groups 11 which are at the front and rear in the direction of travel in each case on both sides of the vehicle can be adjusted in their entirety.

Figure 15:
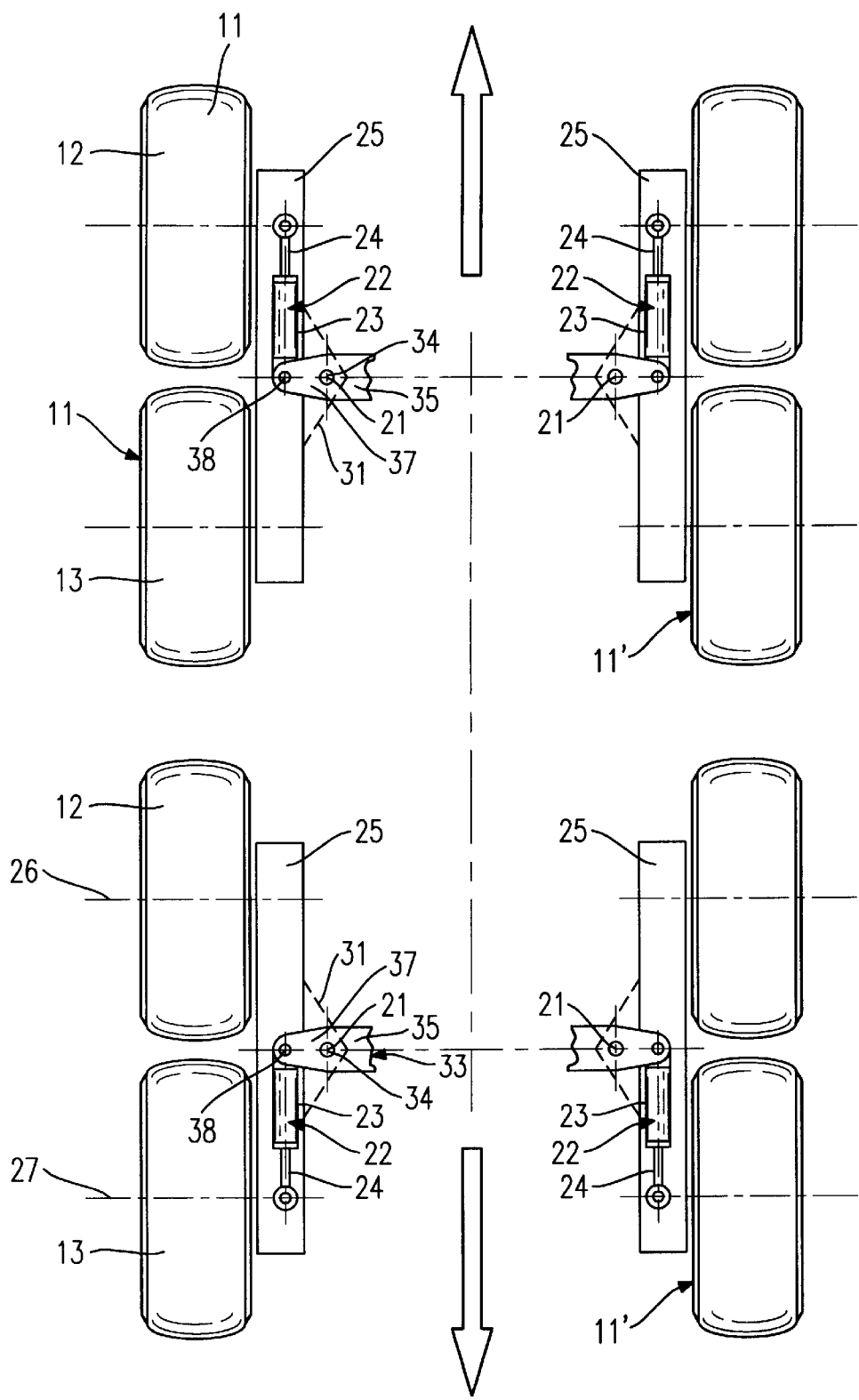
FIG. 15 to FIG. 23 each show views in plan view of different steering positions of the wheels of the vehicle having wheels FIG. 24 to FIG. 28 each show views in plan view of different steering positions of the crawler tracks of the vehicle having crawler tracks

The adjustment of the wheel groups 11 and 11 for steering purposes takes place about the Z-axes 21 with the aid of hydraulic devices 22, as can be seen from FIGS. 7 and 15 etc. Each hydraulic device 22 comprises a cylinder 23 and a piston 24. According to the exemplary embodiment illustrated in the figures, the pistons 24 are articulated by their free ends in each case on a wheel house or wheel support truck 25 which contains essential components of the drive for the wheels 12 and 13 of the vehicle 1 having wheels and elements serving for the mounting of the wheels 12 and 13. The wheels 12 and 13 are mounted in the wheel house 25 in a manner such that they can rotate freely about axes 26 and 27 and can be pivoted jointly and together with the wheel house 25 relative to the vehicle frame 2 about the Z-axis 21. The Z-axis 21 lies outside the wheel house 25 offset towards the vehicle frame 2, as is evident from FIGS. 7 and 15.

For the fastening and pivotable mounting directly on the vehicle frame 2 or onto a support 30 (FIG. 7) the wheel houses 25 each have an upper bearing bracket 31 and, at a distance below it, a lower bearing bracket 32. The two bearing brackets 31 and 32 are assigned the length of a fork 33. Both the bearing brackets 31 and 32 and the legs of the fork 33 have bearing openings 34 which are arranged concentrically with respect to the Z-axis 21. A bearing bolt (not illustrated in FIG. 7) reaches through the bearing openings 34 and is secured in a suitable manner, so that the wheel house 25 can be pivoted together with its wheels 12 and 13 to the left and right about the Z-axis 21 for steering purposes.

The respectively upper leg 35 of the fork 33 is longer than the lower leg 36 and engages with its free end 37 over the wheel house 25 in the manner of a clip, as is illustrated in FIG. 15. The cylinder 23 of the hydraulic device 22 which serves for the steering is articulated on this free end 37 and is mounted such that it can pivot about an axis 38. The axis 38 is parallel to the particular Z-axis 21 and to the bearing bolt (not illustrated in FIG. 7) which lies in this axis.

As soon as the piston 24 in the cylinder 23 of the hydraulic device 22 moves, the position of the wheel house 25 changes as does the position of the wheels 12 and 13 relative to the vehicle frame 2, with the result that the wheels 12, 13 turn to the right or left or are positioned for straight-ahead driving.

Contrary to the illustration in FIG. 7 it is possible, in principle, for the free ends of the two legs 35 and 36 of the fork 33 also to be U-shaped in each case, with the result that each of the two bearing brackets 31 and 32 of the wheel house 25 lies between two legs belonging to the fork 33.

All of the forks 33 and with them the wheel houses 25 and the wheels 12 and 13 or the wheel groups 11 are in each case arranged on the vehicle frame 2 in a manner such that they can pivot about the Y-axes 19.

In order to pivot the forks 33, which support the wheel houses 25 and wheels 12, 13, about the Y-axis 19, bearing bolts 40 are provided and extend from the vehicle frame 2 in the direction of the wheel houses 25.

Each fork 33 is in each case arranged pivotably with a bearing bushing 41 on a bearing bolt 40. In order to secure the fork 33, a holding ring 42 can be provided at the free end of the bearing bolt 40 and, for the mounting, for example two sliding bearings 43 can be provided.

The bearing bolt 40 is expediently tubular at least over part of its length. A power supply line 44 and the corresponding return line 45 from the motor or drive 3 of the vehicle and from a pressure generator located there, for example, can therefore lead through the bearing bolt 40 into the interior of the wheel house 25 and to a hydraulic drive located there or to an electric motor located there (if the vehicle motor drives the generator). For this purpose, the bearing bolts 40 each have lateral passage openings 46 and each wheel house 25 has at least one passage opening 47 in a wall 48 facing away from the wheels 12 and 13.

One bearing bolt 40 in each case for a wheel house 25 and its wheels 12 and 13 is preferably connected rigidly to the vehicle frame 2 on each side at the one end of the vehicle.

At the other end of the vehicle, the wheel houses, 25, which are located on the opposite sides of the vehicle 1, together with their wheels 12 and 13 are, according to FIG. 7, mounted not only such that they can pivot by, for example 5 to 7 degrees, about the Y-axes 19 on the bearing bolts 40, but in addition these bearing bolts 40 can also be pivoted about the X-axis 20 which lies in the longitudinal axis of the vehicle 1. For this purpose, the bearing bolts 40 are arranged on the support 30 which is mounted on the vehicle frame in a manner such that it can pivot about a bearing bolt 50, the axis of the said bearing bolt 50 coinciding with the axis 20 and intersecting the axes of the bearing bolts 40 at right angles (FIG. 7).

The bearing bushings 41 are expediently divided and therefore comprise two half bushings which each fit around the bearing bolts 40. The two half bushings are in each case screwed to each other in the fitted position.

Radial forces are transmitted from the bearing bushings 41 via the sliding bearings 43 to the bearing bolts 40. The axial forces are absorbed by the expediently divided holding rings 42 at the free end of the bearing bolts 40 or by axial stop surfaces 49 which, in the case of the support 30 illustrated in FIG. 7, are provided at the transition from the respective bearing bolts 40 to a central piece 51 of the support 30. The central piece 51 has an orifice 52 and, in a suitable manner which is not of greater interest here, is mounted such that it can pivot by, for example 5 degrees to 7 degrees, on the bearing bolt 50. The bearing bolts 40 are arranged symmetrically on the support 30.

Figure 5:
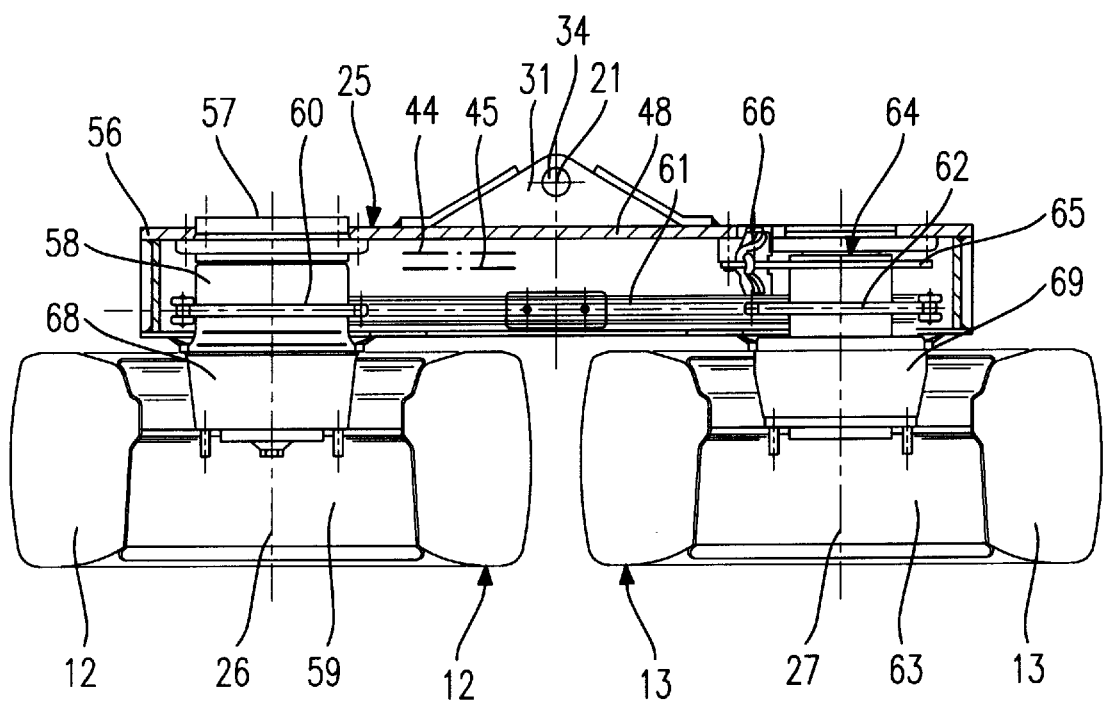
FIG. 5 shows, partially in section, a view of parts of the drive of the wheels of a wheel group.
Figure 6:
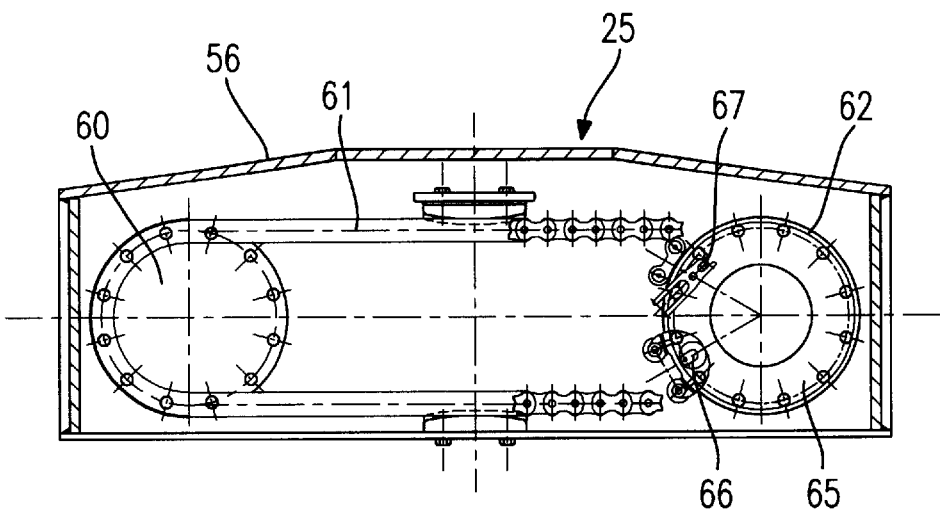
FIG. 6 shows an end view of the drive according to FIG. 5 without wheels.

Further details of the wheel house 25 and of the components located in it are illustrated in FIGS. 5 and 6.

The wheel house 25 comprises an elongated housing 56 in which the two wheels 12 and 13, which support tires, are mounted in a manner which is known in principle and is not of greater interest here. Furthermore, a hydraulic drive 57 and a planetary gear 58 for driving the rim 59 of the first wheel 12, which has one tire, are located in each wheel house 25. In order to drive both wheels 12 and 13 simultaneously, the planetary gear 58 also acts on a chain wheel 60 and transmits the driving power via a chain 61 to a second chain wheel 62, which is connected in a rotationally fixed manner to the rim 63 of the second wheel 13 of the tandem wheel arrangement.

Furthermore, a brake 64 is located in the wheel house 25. The brake comprises a brake disc 65 for a hydraulic brake, i.e. for brake shoes 66. A mechanically acting handbrake 67 can also act on the brake disc 65.

Instead of the hydraulic drive 57, which is supplied with power via the power supply line 44, an electric motor may also be provided.

In principle, the drive 57 having the chain wheel 60 is assigned to the one wheel 12 and the braking device having the hydraulic-brake 66 and the handbrake 67 is assigned to the other wheel 13.

The chain drive ensures that both wheels are in each case stationary or rotate synchronously.

The mounting of the wheel hubs 68 and 69, to which the rims 59 and 63 are fastened, is not illustrated in detail, since the features here are known in principle. As shown in FIG. 5, the spacing distance existing between the two tires is quite small, for example less than the radius of one of the tires.

Instead of the rims 59 and 63, it is also possible for chain wheels 70a and 71a for crawler tracks 72a or chains of a crawler-type vehicle or tracklaying vehicle according to FIGS. 8 to 14 to be provided on the wheel hubs 68 and 69. In principle, in this exemplary embodiment the same parts have the same reference numbers and, in addition, the letter index a.

Instead of four wheel groups 11 having wheels 12, 13 supporting eight tires, the vehicle 1a has eight chain wheels 70a and 71a for four chains or crawler tracks 72a. The two chain wheels 70a and 71a, which are driven in each case, form together with a crawler track or chain 72a, a respective wheel group 11a, as in the case of the wheels 12 and 13 which support tires. The steering and the drive are identical in each case. The wheel houses 25 and 25a of the two vehicles 1 and 1a and the components which are located in the wheel houses 25 and 25a therefore likewise correspond, as also emerges from a comparison of FIGS. 5 and 6 with FIGS. 12 and 13.

Figure 14:
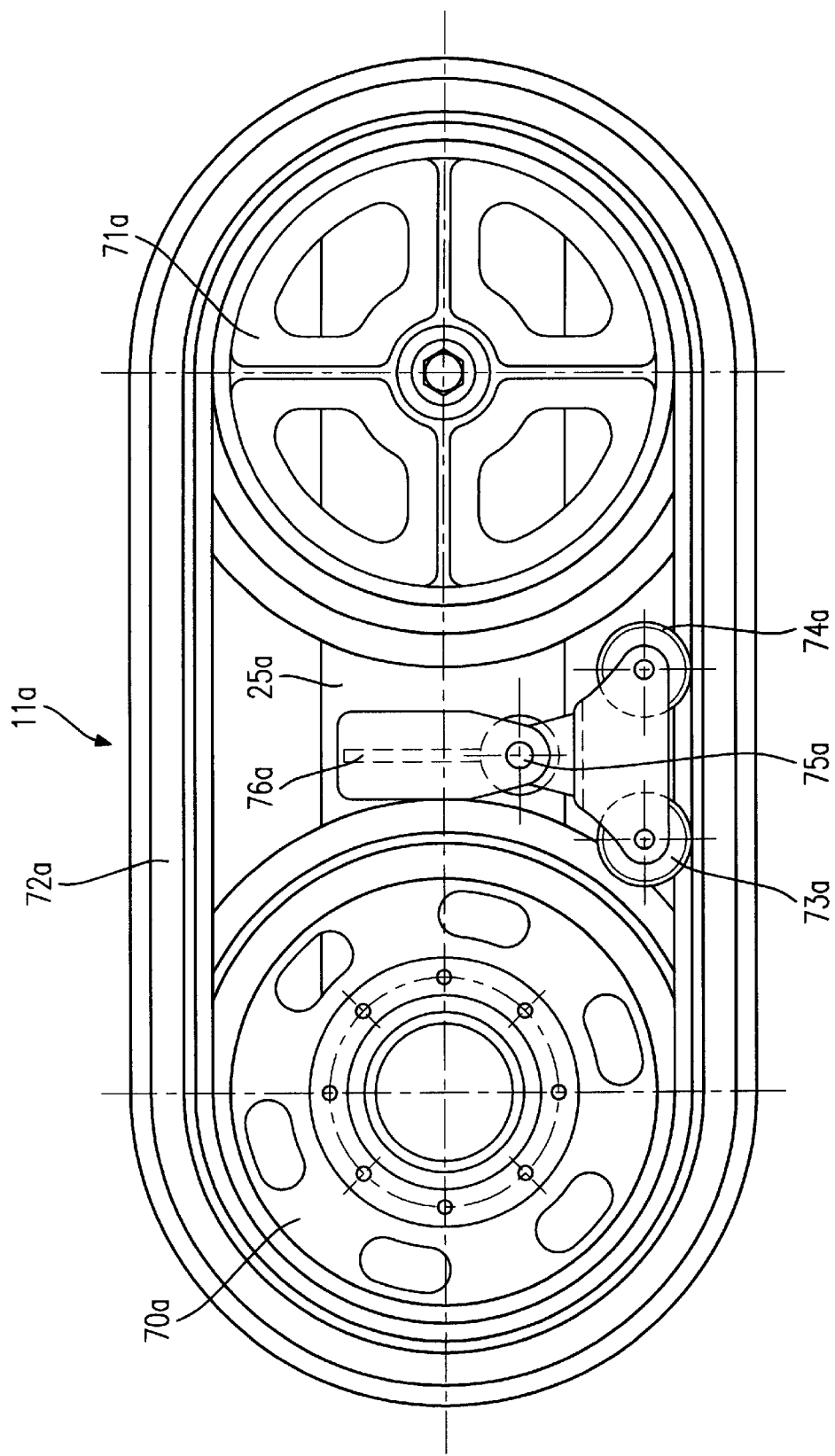
FIG. 14 shows, in an end view, an illustration of a crawler-track-arrangement.

One particular detail of the wheel group 11a which has chain wheels 70a and 71a supporting a chain or crawler track 72a is illustrated in FIG. 14. The wheels 70a and 71a are arranged close together, for example spaced apart by much less than one radius of the wheels, as shown in FIG. 14. The wheel group further comprises auxiliary rollers 73a and 74a which can be fastened on the wheel house 25a in a manner such that they can pivot about an axis 75a and such that they can optionally be adjusted vertically along a longitudinal hole 76a. The bearing axes of the two auxiliary rollers 73a and 74a, which roll along the crawler track or chain 72a outside the track of the chain wheels 70a and 71a, form an approximately equilateral triangle, as is evident from FIG. 14.

All of the wheel groups 11 or 11a having in each case two wheels 12 and 13 which have tires or having in each case chain wheels 70a and 71a supporting crawler tracks or chains 72a are driven and can be steered, as is illustrated in FIGS. 15 to 28.

The position of the wheel groups 11 for straight-ahead driving is illustrated in FIG. 15. The vehicle 1 or 1a is moreover preferably capable equally of driving forwards and backwards, as emerges from the arrows in FIGS. 15 to 28.

Figure 16:
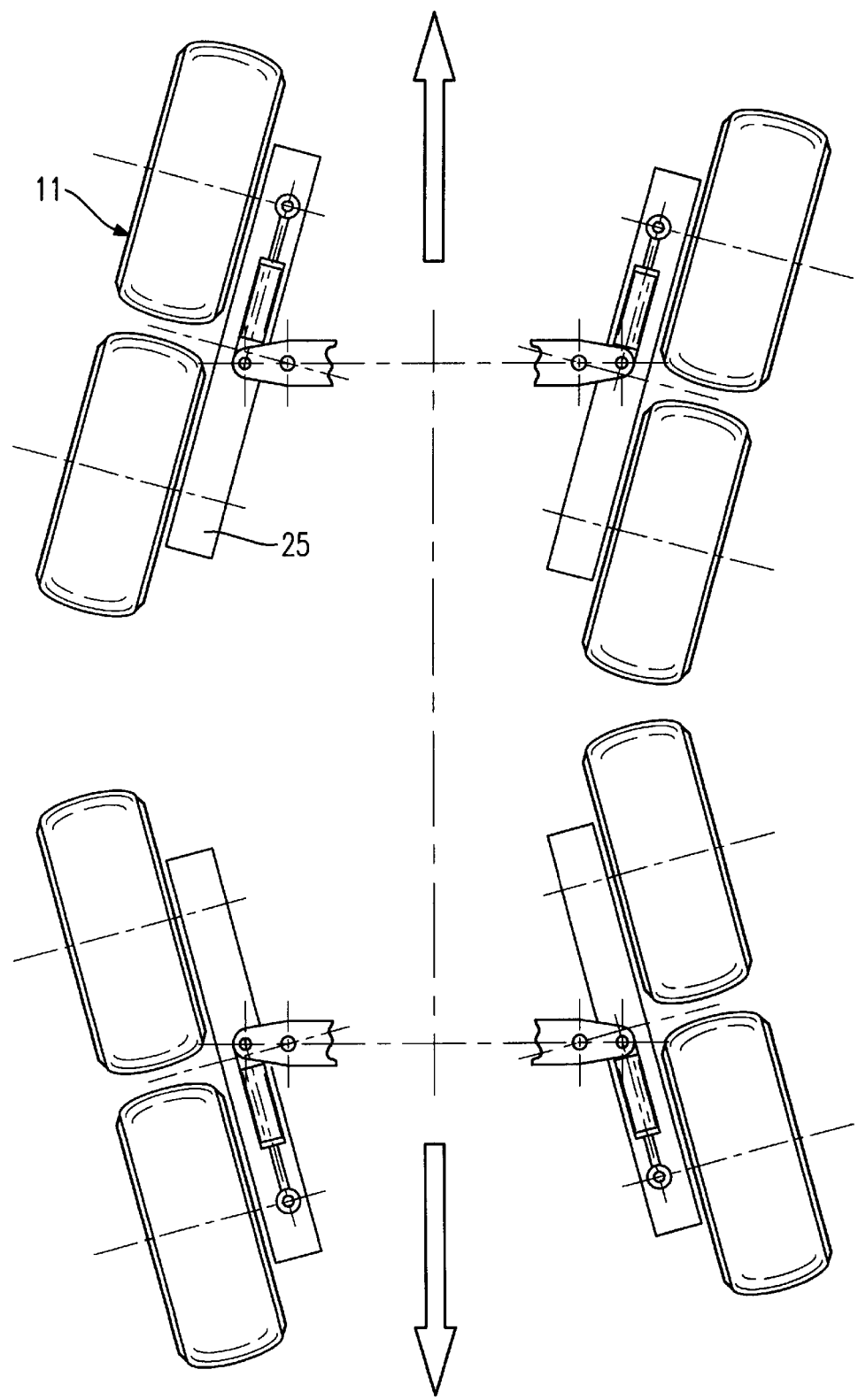
Figure 19:
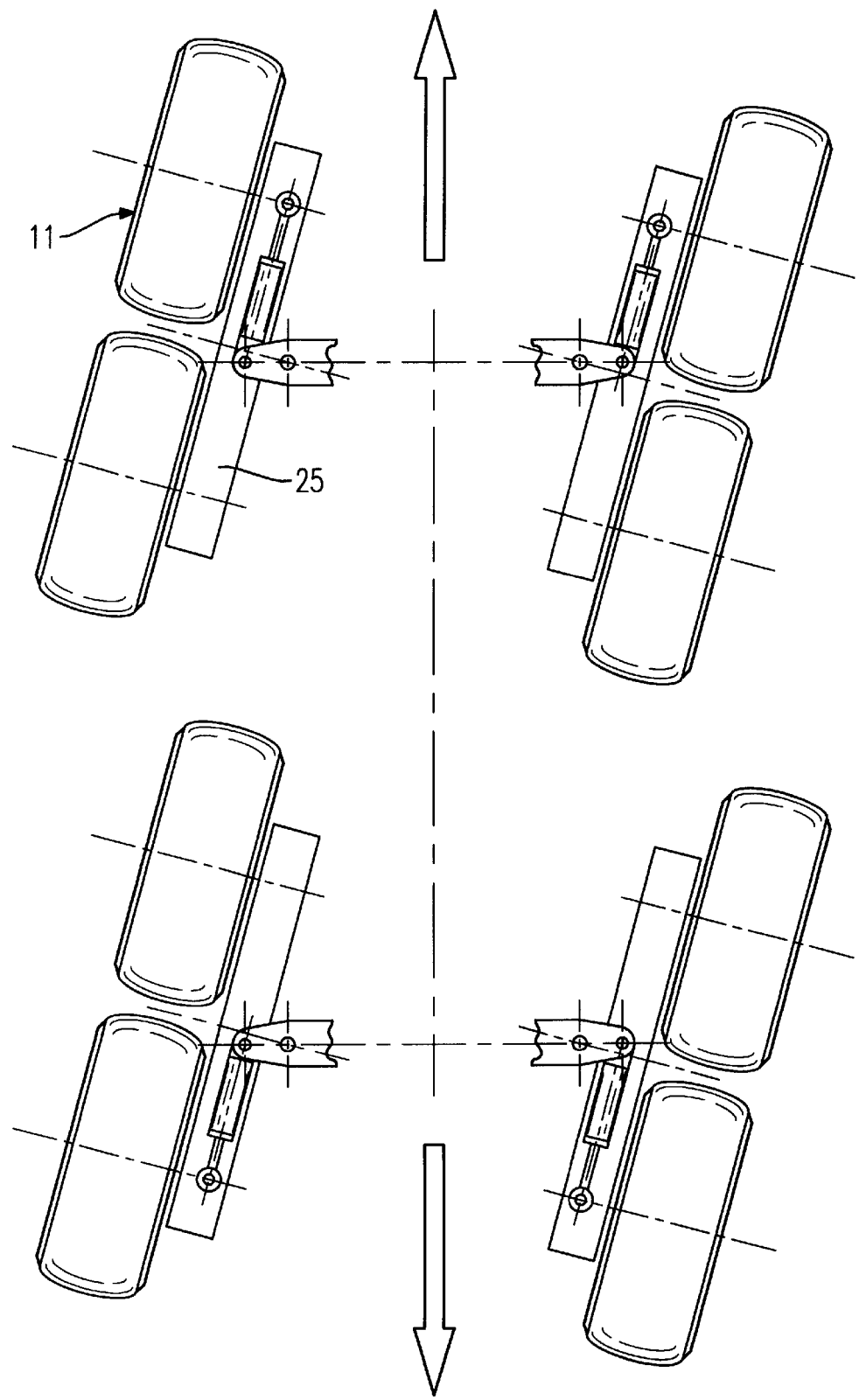
Figure 20:
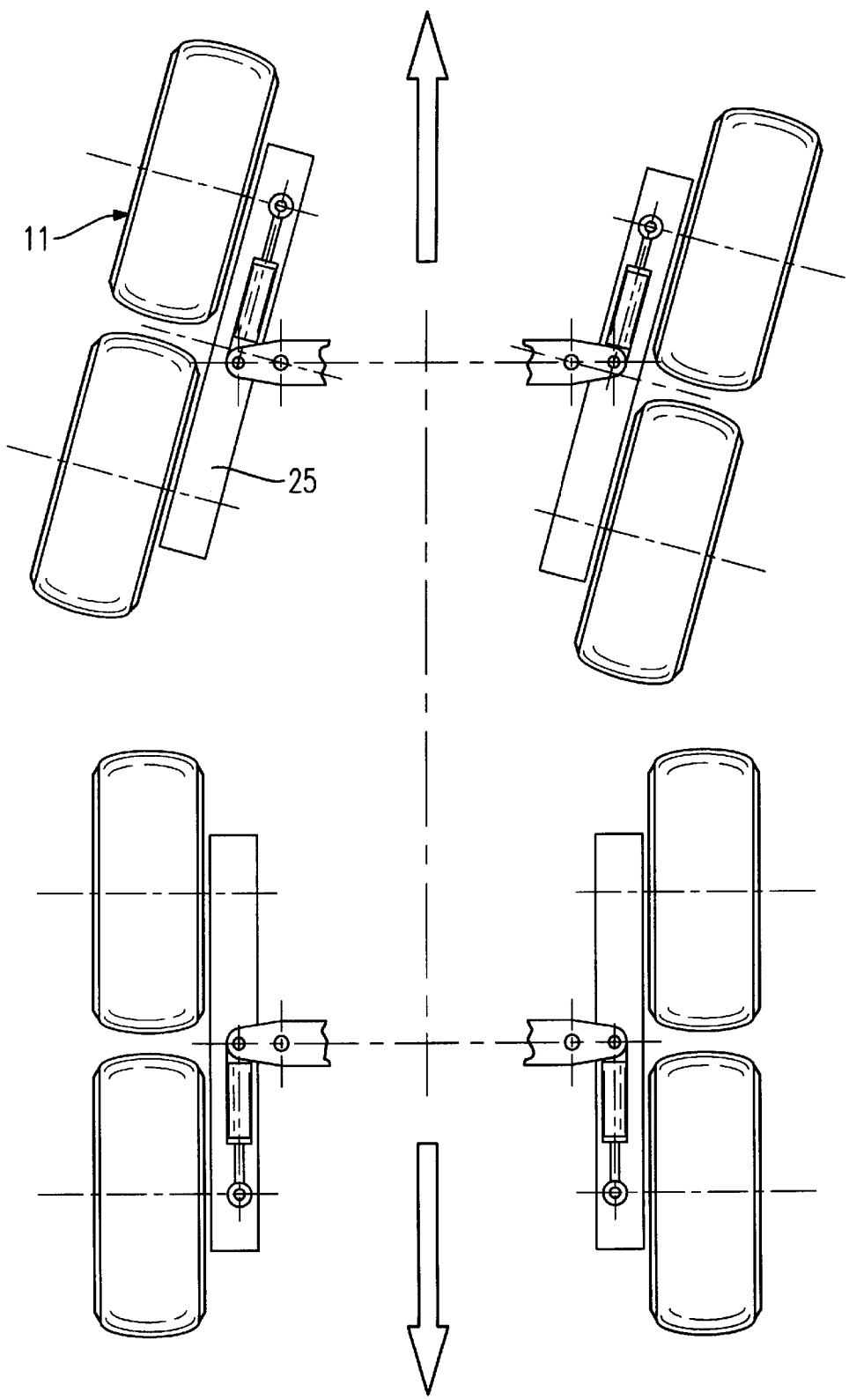
Figure 21:
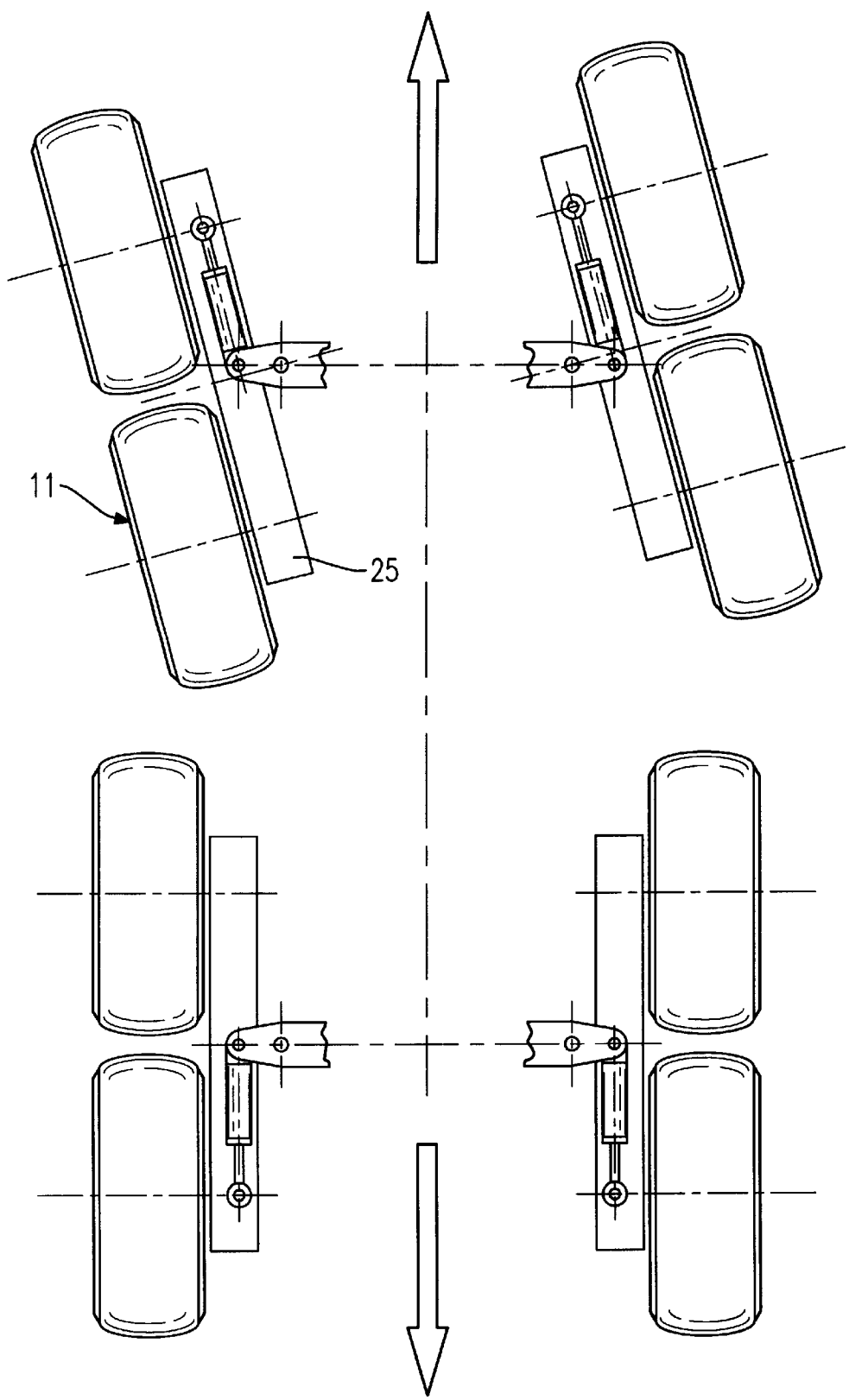
Figure 22:
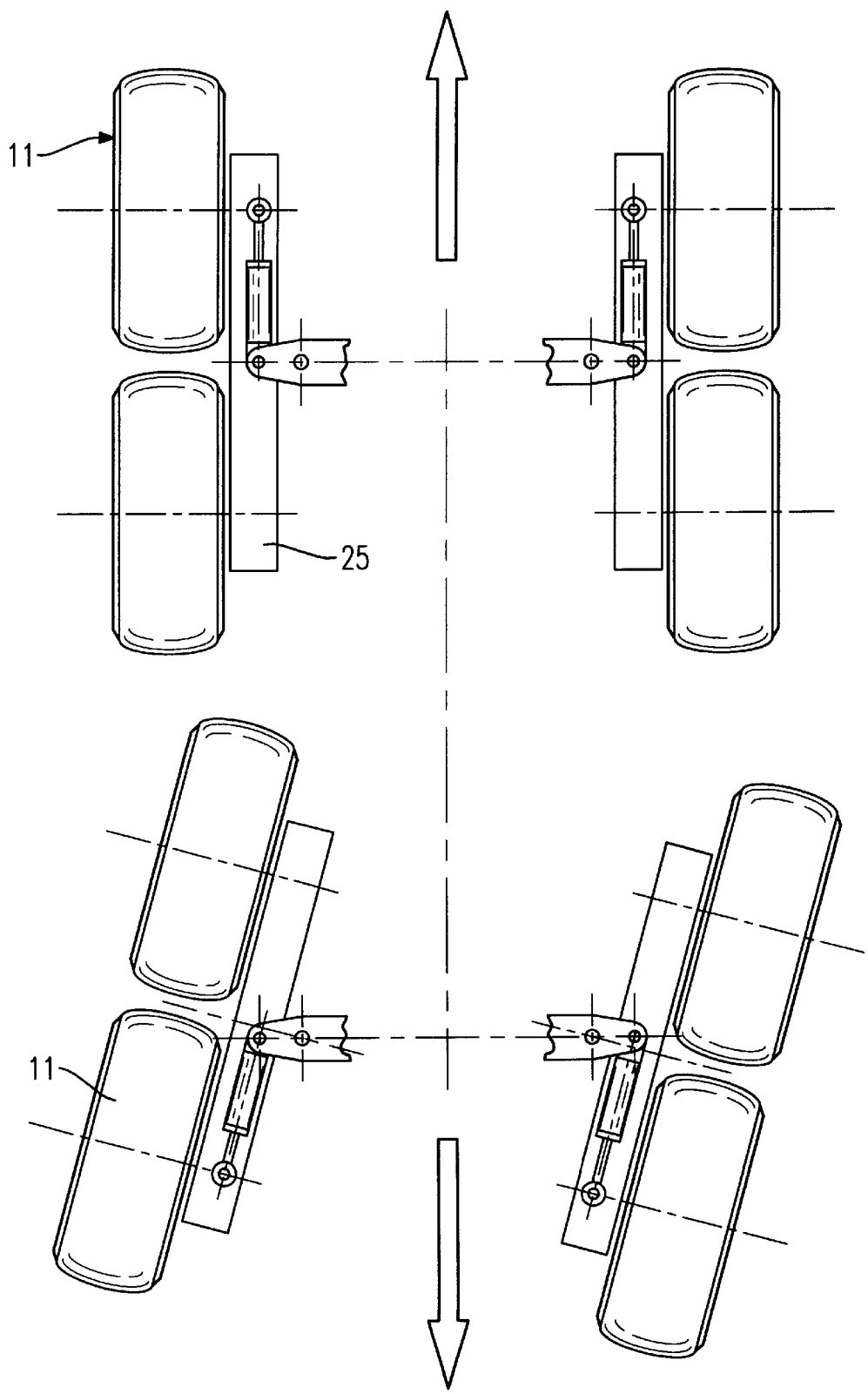
Figure 23:
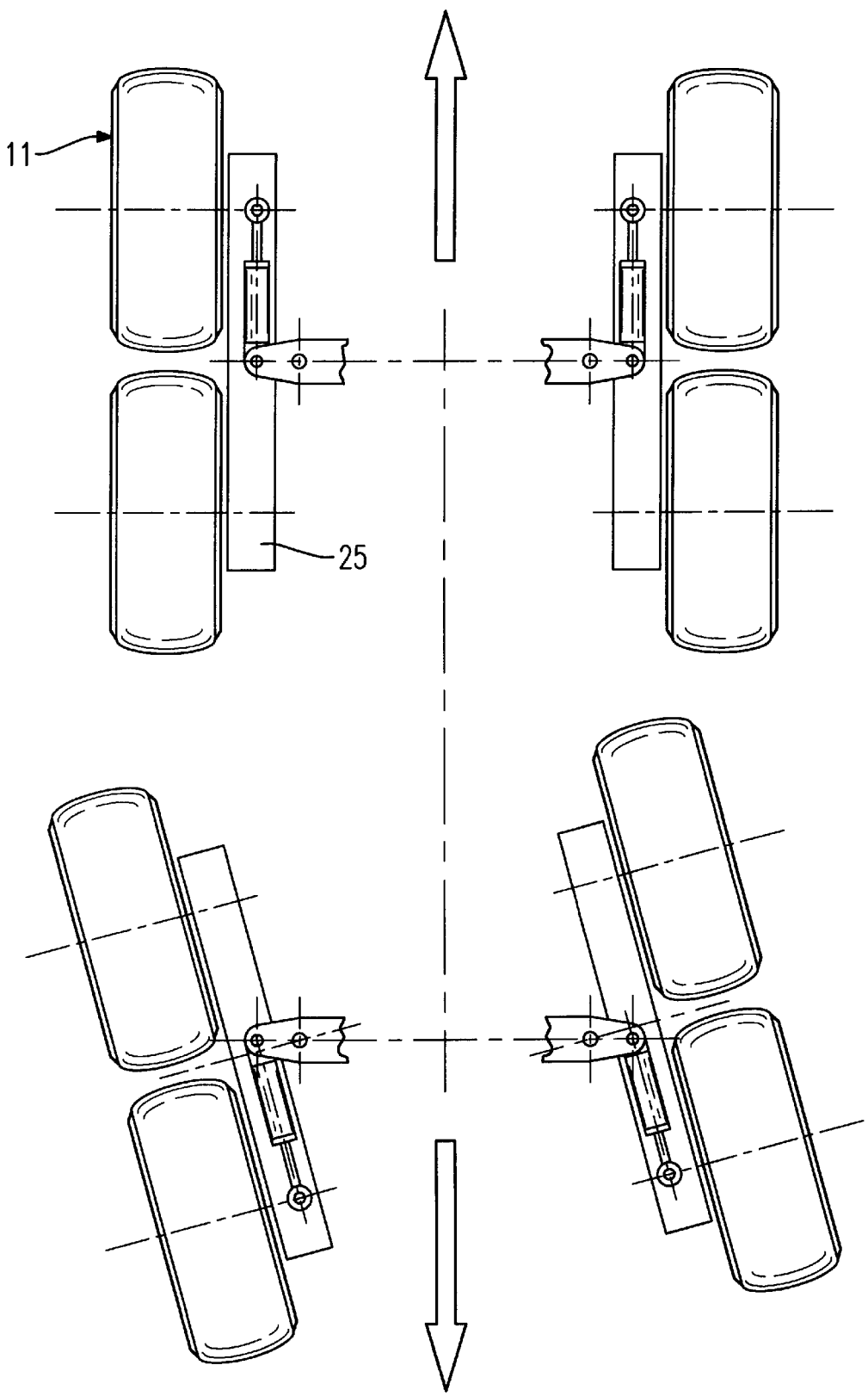

For tight cornering in the direction of travel to the right at the front or to the left at the rear, the wheel groups 11 at the two ends of the vehicle 1a can be appropriately turned in opposite directions (FIG. 16). For tight cornering in the other direction, the wheel groups 11 at the one end can be turned to the left and at the other end to the right (FIG. 17). For angled or skew driving to the left or right, the wheel groups 11 at the two ends of the vehicle can be turned parallel to one another jointly to the left (FIG. 18) or to the right (FIG. 19).

For driving around large corners, the wheel groups 11 can be turned to the right (FIG. 20) or to the left (FIG. 21) via the wheel houses 25 at the one end of the vehicle 1 and the other end can each remain straight ahead. For cornering in the other direction or if only the rear wheel groups 11 are to be steered, the wheel groups 11 at the one end are directed for straight-ahead driving and at the other end of the vehicle are set obliquely to the right or left, as emerges from FIGS. 22 and 23.

Figure 24:
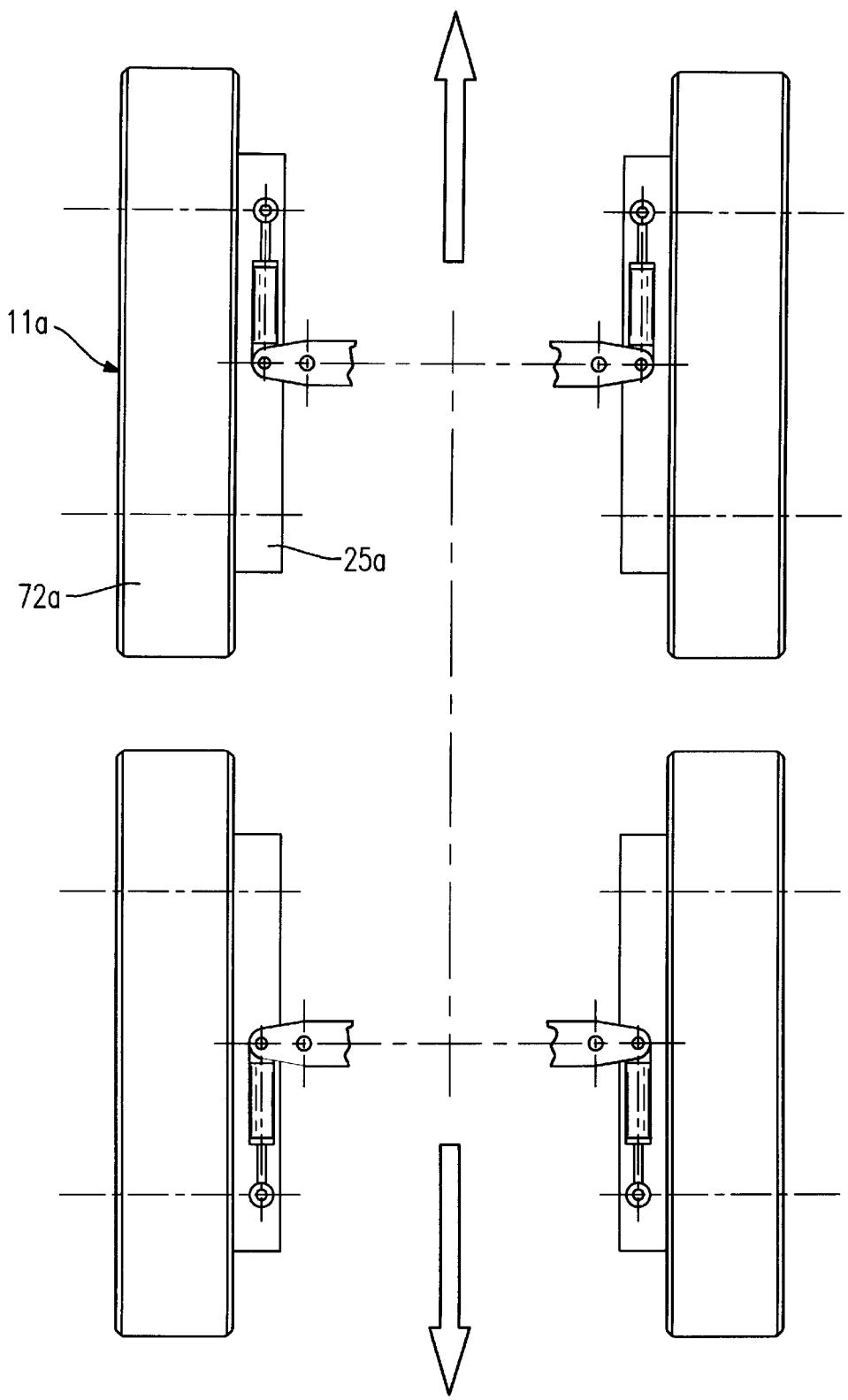
Figure 25:
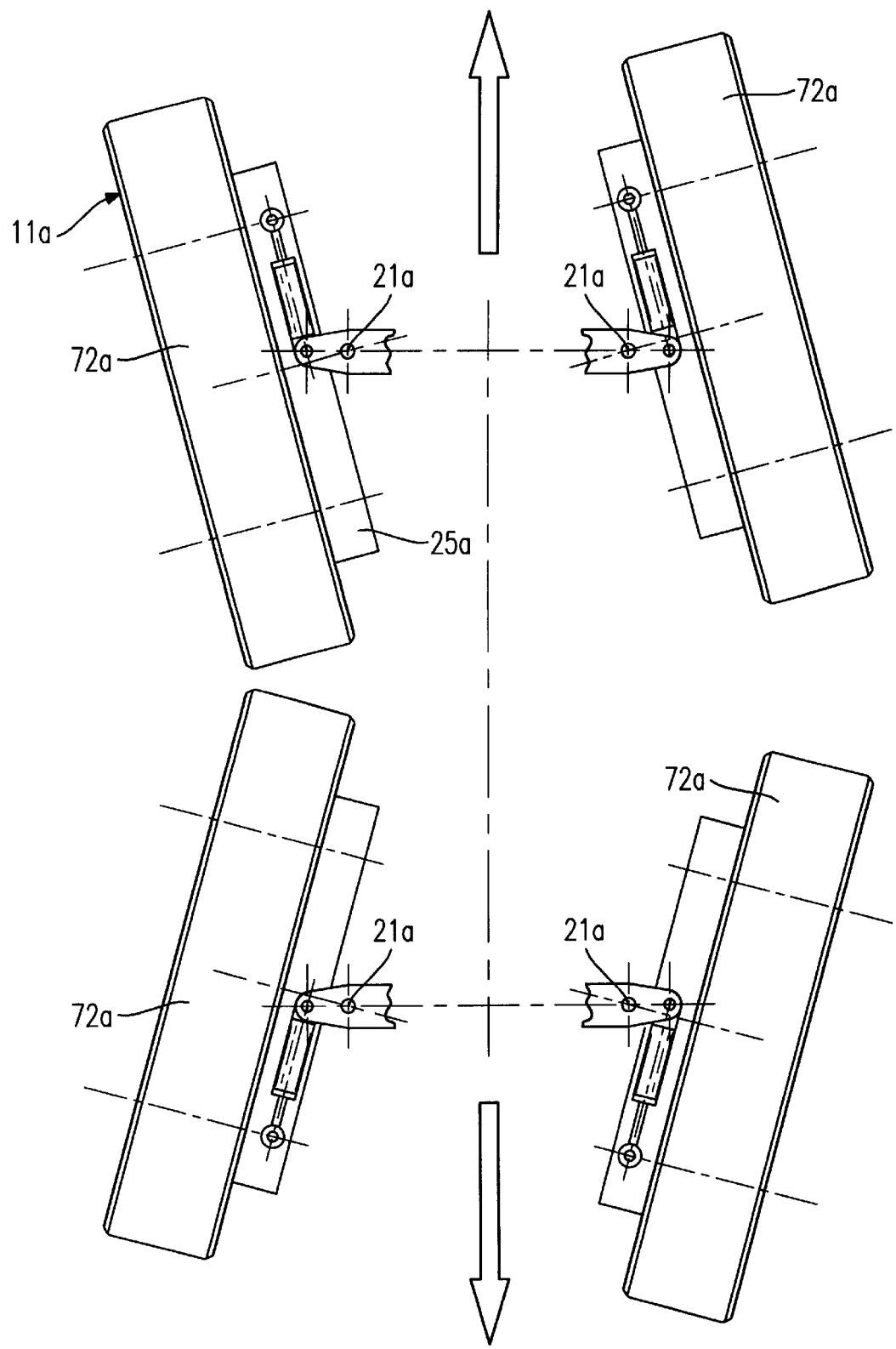

In principle, the same applies for the position of the wheel groups 11a and their wheel houses 25a in the case of the vehicle 1a having chain wheels 70a and 71a and having crawler tracks 72a. FIG. 24 shows the straight-ahead driving and FIG. 25 shows the tight cornering at the front to the left or at the rear to the right with four crawler tracks 72a which can be pivoted about the vertical axes 21a. It goes without saying that the wheel groups 11a having crawler tracks 72a can be turned or pivoted in the same manner in the opposite direction for tight cornering.

Figure 26:
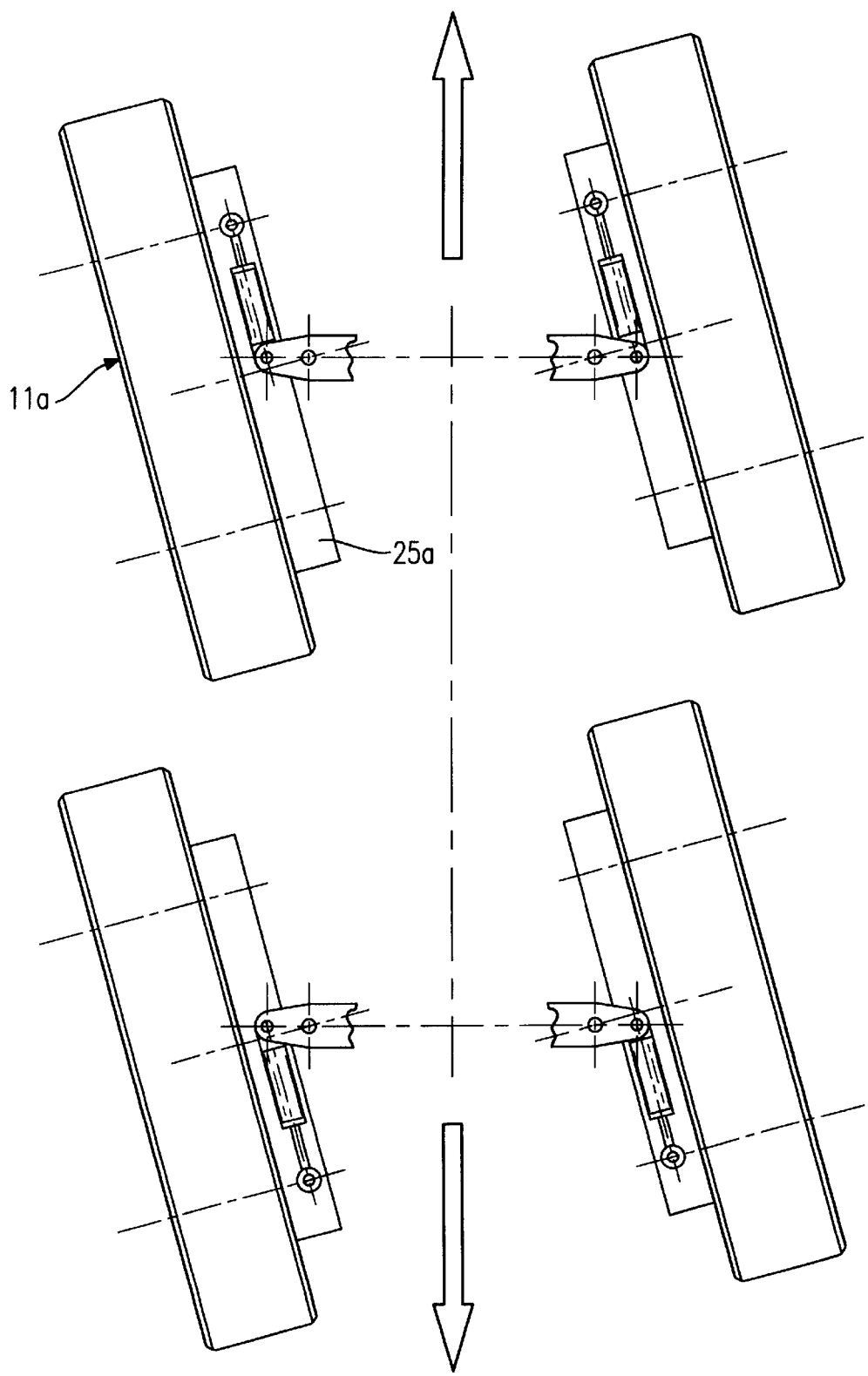

For angled or skew driving, the wheel groups 11a can be pivoted or turned into a position which is oblique with respect to the vehicle and is parallel to one another, in accordance with FIG. 26.

Figure 27:
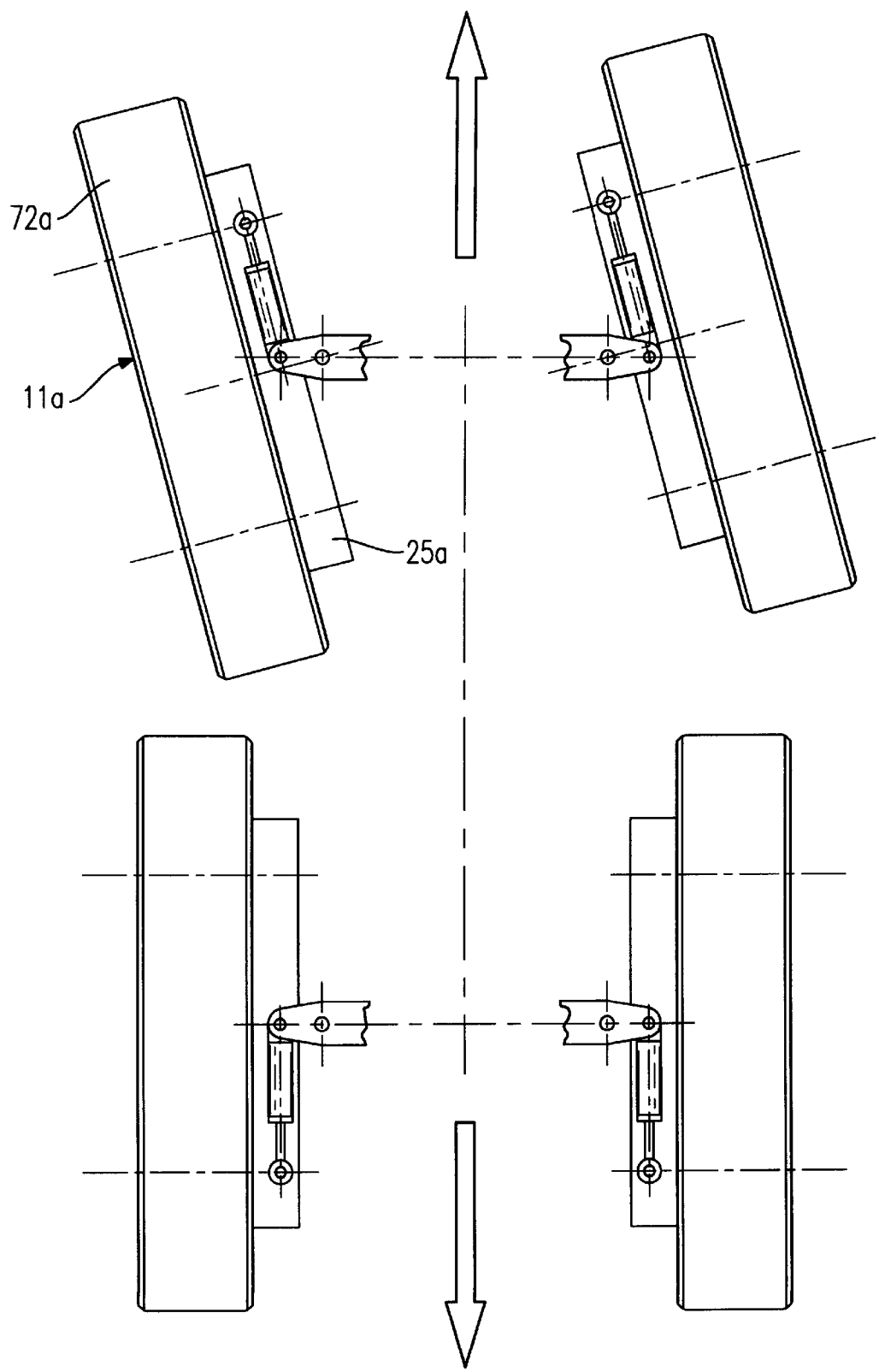
Figure 28:
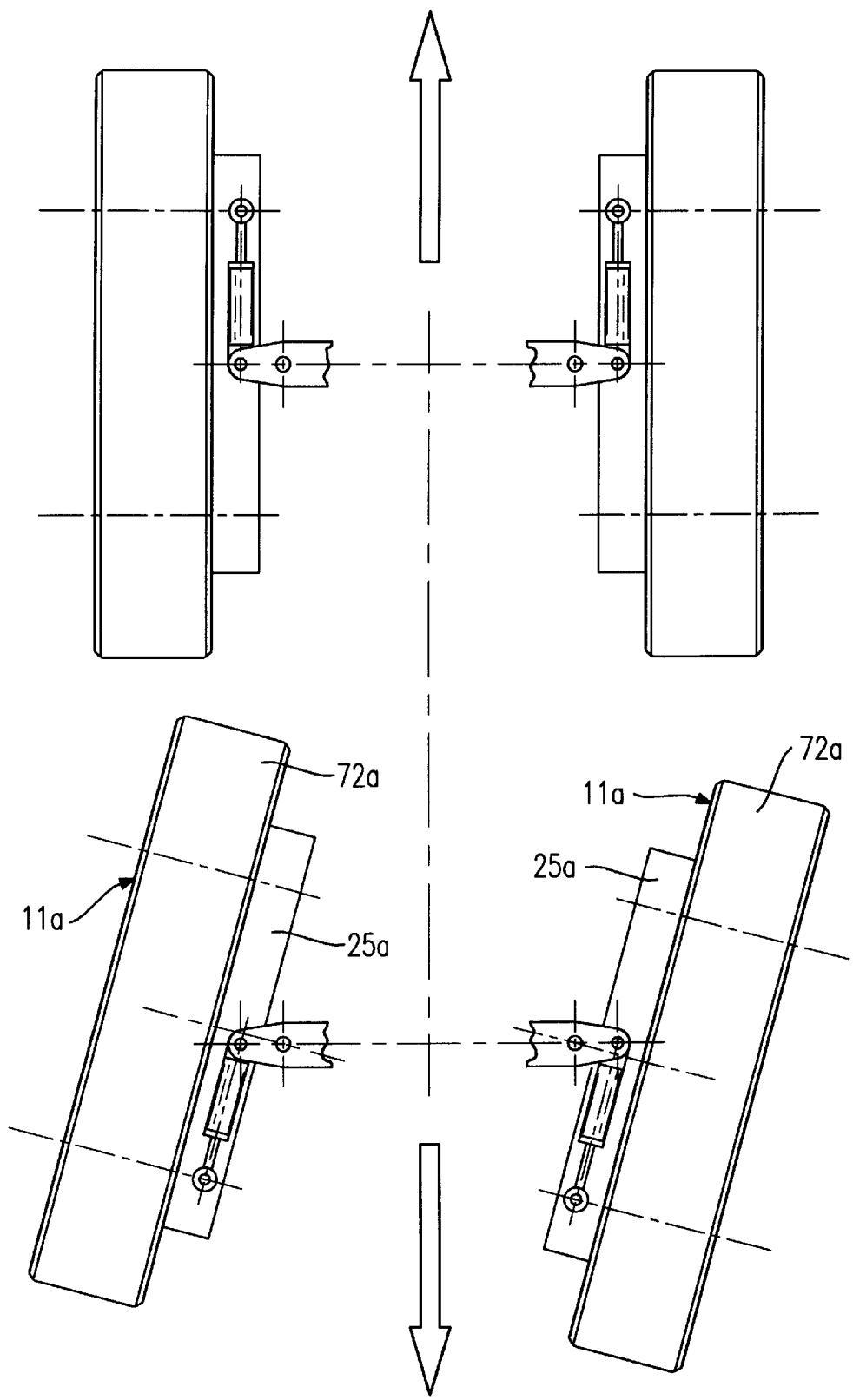

For driving around small corners, the wheel groups 11a having crawler tracks 72a can be turned at the one end of the vehicle to the right or left according to FIG. 27 and are set at the other end of the vehicle for straight-ahead driving, while when driving in the other direction or if steering is to be carried out using the rear wheel groups 11a, the wheel groups 11a, which are located at the other end of the vehicle and have crawler tracks or chains 72a, can be pivoted or turned together with their wheel housing 25a (FIG. 28).

It goes without saying that the wheel groups 11a having crawler tracks or chains 72a can be turned and controlled in just the same manner applicable to the wheel groups 11 having wheels 12 and 13. Added to this is the ability of all wheel groups to pivot at both ends of the vehicle about the Y-axes 19, which lie transversely with respect to the longitudinal axis of the vehicle, and, in addition, the ability of the wheel groups 11 and 11a at the one end of the vehicle to pivot about the X-axis 20 lying in the longitudinal direction of the vehicle (FIG. 7).

The adjustment for steering purposes of the wheel groups 11 having wheels 12, 13 which support tires and of the wheel groups 11a which have crawler tracks 72a takes place with the aid of the hydraulic devices 22 having piston 24 and cylinder 23, while the adjustment of the wheel groups 11 and 11a by in each case approximately 5 to 7 degrees about the axes 19 and 20 takes place automatically in each case.

Blocking of the automatic adjustment capability is possible, for example using blocking bolts 80 which are effective between the respectively moving part and the vehicle frame 2 and grip into suitable blocking openings (not illustrated). A hydraulic or electric actuating drive 81 can be provided for each blocking bolt 80.

The invention is not restricted to the exemplary embodiments illustrated in the figures; rather, further modifications are also possible without departing from the basic concept of the invention. This also includes the design of a vehicle which has wheels with tires or chain wheels with crawler tracks, in which case both the wheels and the crawler tracks can be steered at the vehicle frame and are arranged such that they can pivot about axes lying transversely with respect to the longitudinal axis.

What is claimed is:

1. A utility vehicle comprising:
   a vehicle frame;
   a drive power unit mounted on said vehicle frame; and
   an undercarriage carrying said vehicle frame; wherein:
      said undercarriage includes a first right wheel group and a second right wheel group on a right side of said vehicle, and a first left wheel group and a second left wheel group on a left side of said vehicle;
      each one of said wheel groups comprises a respective wheel house, two wheels that are rotatable relative to said wheel house and arranged one behind another in a running direction, and tires or a crawler track arranged on said wheels;

said undercarriage further includes brakes and at least parts of a propulsive drive that are arranged in said wheel houses of said wheel groups;

said first right wheel group and said first left wheel group, or said second right wheel group and said second left wheel group, can be jointly pivoted together with one another about a longitudinal axis of said vehicle;

each respective one of said wheel groups respectively can be steered by pivoting an entirety of said respective wheel group about a respective steering axis; and each respective one of said wheel groups respectively can be pivoted about a respective transverse axis extending transversely relative to said longitudinal axis.

2. A utility vehicle comprising:

a vehicle frame;

a main power unit mounted on said vehicle frame; and four tandem wheel groups connected to said vehicle frame, including a front right tandem wheel group, a front left tandem wheel group, a rear right tandem wheel group, and a rear left tandem wheel group; wherein:

each one of said tandem wheel groups respectively comprises a wheel support truck, two wheels arranged one behind another in a running direction and rotatably connected to said wheel support truck, and a respective ground contact tire mounted on each one of said wheels, wherein said tires directly contact and are supported on a ground surface below said vehicle on which said vehicle is operating, and wherein said vehicle is supported on said ground surface by said tires directly contacting and supported on said ground surface;

said front right tandem wheel group and said front left tandem wheel group, or said rear right tandem wheel group and said rear left tandem wheel group, are pivotally connected to said vehicle frame so as to be pivotable together with one another about a longitudinal axis of said vehicle;

each one of said tandem wheel groups is independently pivotally connected to said vehicle frame to be independently pivotable respectively about a front transverse axis or a rear transverse axis that both extend transversely relative to said longitudinal axis; and said four tandem wheel groups are each respectively pivotally connected to said vehicle frame to be pivotable and thereby steerable about a respective individual one of four steering axes.

3. The utility vehicle according to claim 2, having a total of exactly eight of said wheels and no additional wheels contacting said ground surface.

4. The utility vehicle according to claim 2, wherein both of said wheels of a respective one of said tandem wheel groups are driven with drive power from said main power unit.

5. The utility vehicle according to claim 4, further comprising a hydraulic drive motor or an electric drive motor that directly drives a first one of said two wheels of said respective tandem wheel group and that is connected to said main power unit to receive power therefrom, and a drive chain that connects said first one of said two wheels to a second one of said two wheels so as to drive said second wheel synchronously with said first wheel.

6. The utility vehicle according to claim 2, wherein said two wheels of a respective one of said tandem wheel groups are arranged spaced apart from each other, wherein a spacing distance existing between said tires mounted on said two wheels is less than a radius of one of said tires.

7. The utility vehicle according to claim 2, further comprising:

a common transverse support that is pivotally connected to said vehicle frame to be pivotable about said longitudinal axis; and two pivot arrangements that are pivotally connected respectively to two opposite ends of said common transverse a support to be pivotable about said front transverse axis or said rear transverse axis which is defined by said common transverse support; and wherein said wheel support trucks of said right tandem wheel group and said left tandem wheel group that are pivotable together with one another about said longitudinal axis are respectively pivotally connected to said pivot arrangements to be respectively pivotable about respective ones of said steering axes.

8. The utility vehicle according to claim 2, wherein said four steering axes are respectively located displaced inwardly toward said longitudinal axis from a respective associated one of said tandem wheel groups.

9. A utility vehicle comprising:

a vehicle frame;

a main power unit mounted on said vehicle frame; and four tandem wheel groups connected to said vehicle frame, including a front right tandem wheel group, a front left tandem wheel group, a rear right tandem wheel group, and a rear left tandem wheel group; wherein:

each one of said tandem wheel groups respectively comprises a wheel support truck, two track drive wheels arranged one behind another in a running direction and rotatably connected to said wheel support truck, and an endless loon crawler track arranged on said two track drive wheels;

both of said track drive wheels of a respective one of said tandem wheel groups are driven with drive power from said main power unit;

said front right tandem wheel group and said front left tandem wheel group, or said rear right tandem wheel group and said rear left tandem wheel group, are pivotally connected to said vehicle frame so as to be pivotable together with one another about a longitudinal axis of said vehicle:

each one of said tandem wheel groups is independently pivotally connected to said vehicle frame to be independently pivotable respectively about a front transverse axis or a rear transverse axis; that both extend transversely relative to said longitudinal axis: and said four tandem wheel groups are each respectively pivotally connected to said vehicle frame to be pivotable and thereby steerable about a respective individual one of four steering axes; and further comprising a hydraulic drive motor or an electric drive motor that directly drives a first one of said two track drive wheels of said respective tandem wheel group and that is connected to said main power unit to receive power therefrom, and a drive chain that connects said first one of said two track drive wheels to a second one of said two track drive wheels so as to drive said second track drive wheel synchronously with said first track drive wheel.

10. A utility vehicle comprising:

a vehicle frame;

a main power unit mounted on said vehicle frame, and four tandem wheel groups connected to said vehicle frame, including a front right tandem wheel group, a front left tandem wheel group, a rear right tandem wheel group, and a rear left tandem wheel group; wherein:

each one of said tandem wheel groups respectively comprises a wheel support truck, two track drive wheels arranged one behind another in a running direction and rotatably connected to said wheel support truck, and an endless loop crawler track arranged on said two track drive wheels;

both of said track drive wheels of a respective one of said tandem wheel groups are driven with drive power from said main power unit;

said front right tandem wheel group and said front left tandem wheel group, or said rear right tandem wheel group and said rear left tandem wheel group, are pivotally connected to said vehicle frame so as to be pivotable together with one another about a longitudinal axis of said vehicle;

each one of said tandem wheel groups is independently pivotally connected to said vehicle frame to be independently pivotable respectively about a front transverse axis or a rear transverse axis that both extend transversely relative to said longitudinal axis;

said four tandem wheel groups are each respectively pivotally connected to said vehicle frame to be pivotable and thereby steerable about a respective individual one of four steering axes;

said two track drive wheels of a respective one of said tandem wheel groups are arranged spaced apart from each other; and a spacing distance existing between said two track drive wheels is less than a radius of one of said track drive wheels.

11. A utility vehicle comprising:

a vehicle frame;

a main power unit mounted on said vehicle frame; and four tandem wheel groups connected to said vehicle frame, including a front right tandem wheel group, a front left tandem wheel group, a rear right tandem wheel group, and a rear left tandem wheel group; wherein:

each one of said tandem wheel groups respectively comprises a wheel support truck, two track drive wheels arranged one behind another in a running direction and rotatably connected to said wheel support truck, and an endless loop crawler track arranged on said two track drive wheels;

both of said track drive wheels of a respective one of said tandem wheel groups are driven with drive power from said main power unit;

said front right tandem wheel group and said front left tandem wheel group, or said rear right tandem wheel group and said rear left tandem wheel group, are pivotally connected to said vehicle frame so as to be pivotable together with one another about a longitudinal axis of said vehicle;

each one of said tandem wheel groups is independently pivotally connected to said vehicle frame to be independently pivotable respectively about a front transverse axis or a rear transverse axis that both extend transversely relative to said longitudinal axis;

said four tandem wheel groups are each respectively pivotally connected to said vehicle frame to be pivotable and thereby steerable about a respective individual one of four steering axes; and said four steering axes are respectively located displaced inwardly toward said longitudinal axis from a respective associated one of said tandem wheel groups.

12. The utility vehicle according to claim 11, further comprising:

a common transverse support that is pivotally connected to said vehicle frame to be pivotable about said longitudinal axis; and two pivot arrangements that are pivotally connected respectively to two opposite ends of said common transverse support to be pivotable about said front transverse axis or said rear transverse axis which is defined by said common transverse support; and wherein said wheel support trucks of said right tandem wheel group and said left tandem wheel group that are pivotable together with one another about said longitudinal axis are respectively pivotally connected to said pivot arrangements to be respectively pivotable about respective ones of said steering axes.

* * * * *